Jan. 20, 1953  P. W. SPELL  2,625,783
COTTON-PICKING APPARATUS
Original Filed Jan. 25, 1944  10 Sheets—Sheet 9
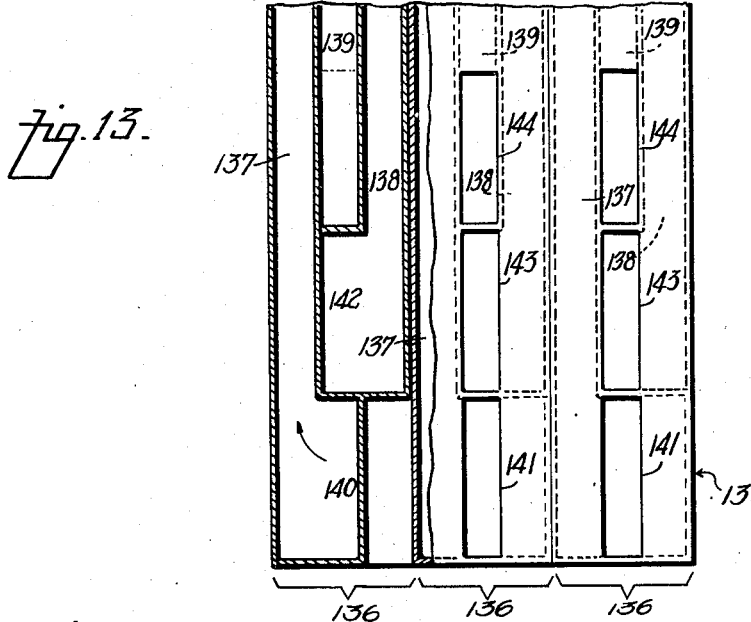
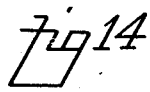
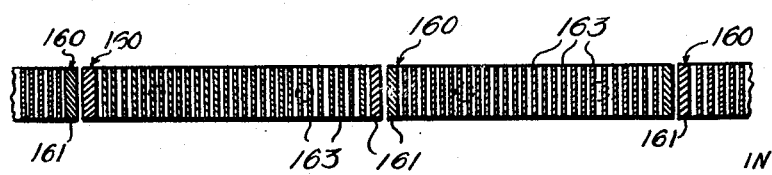
INVENTOR
PERRY W. SPELL
By H. G. Lombard
Attorney

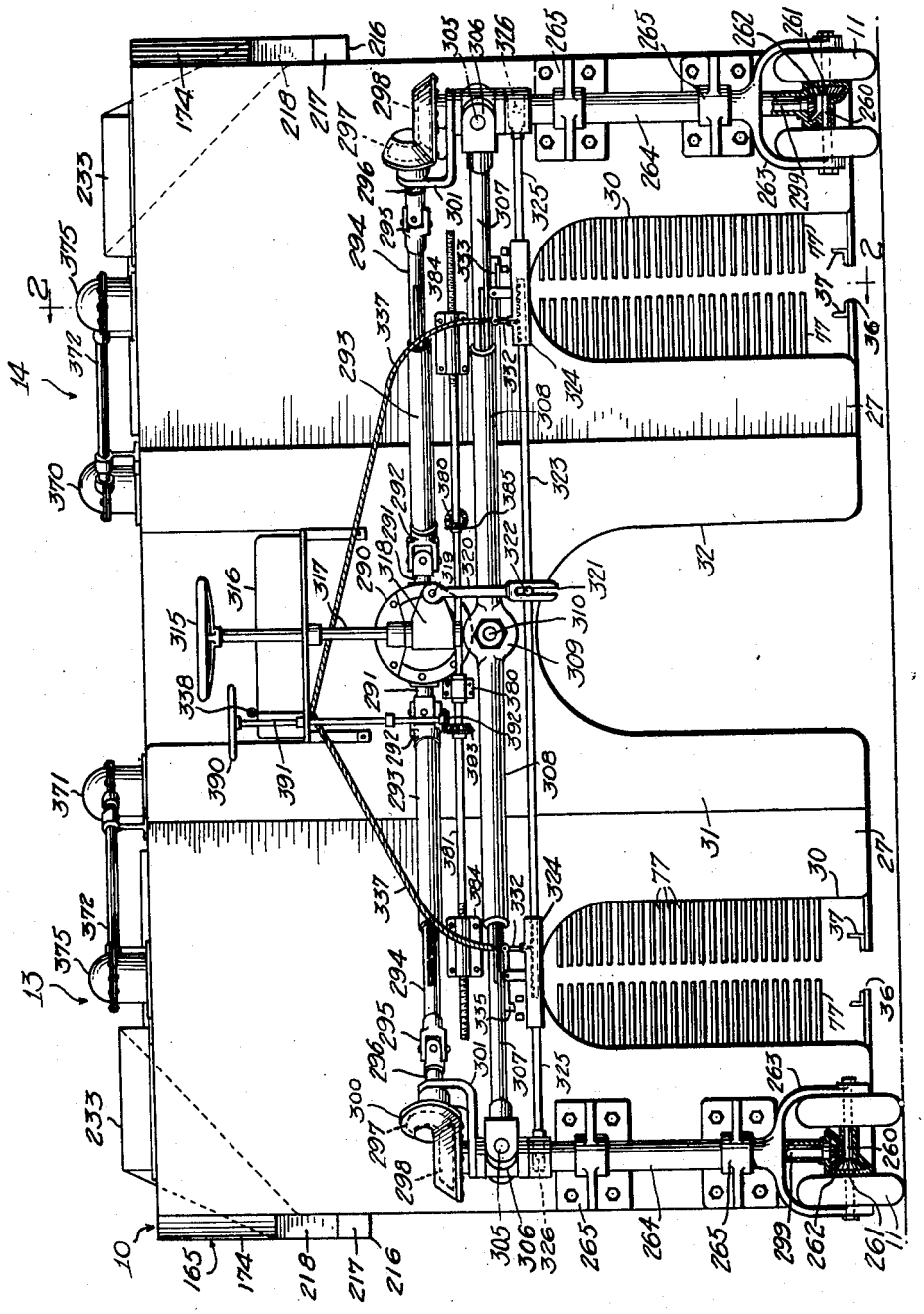

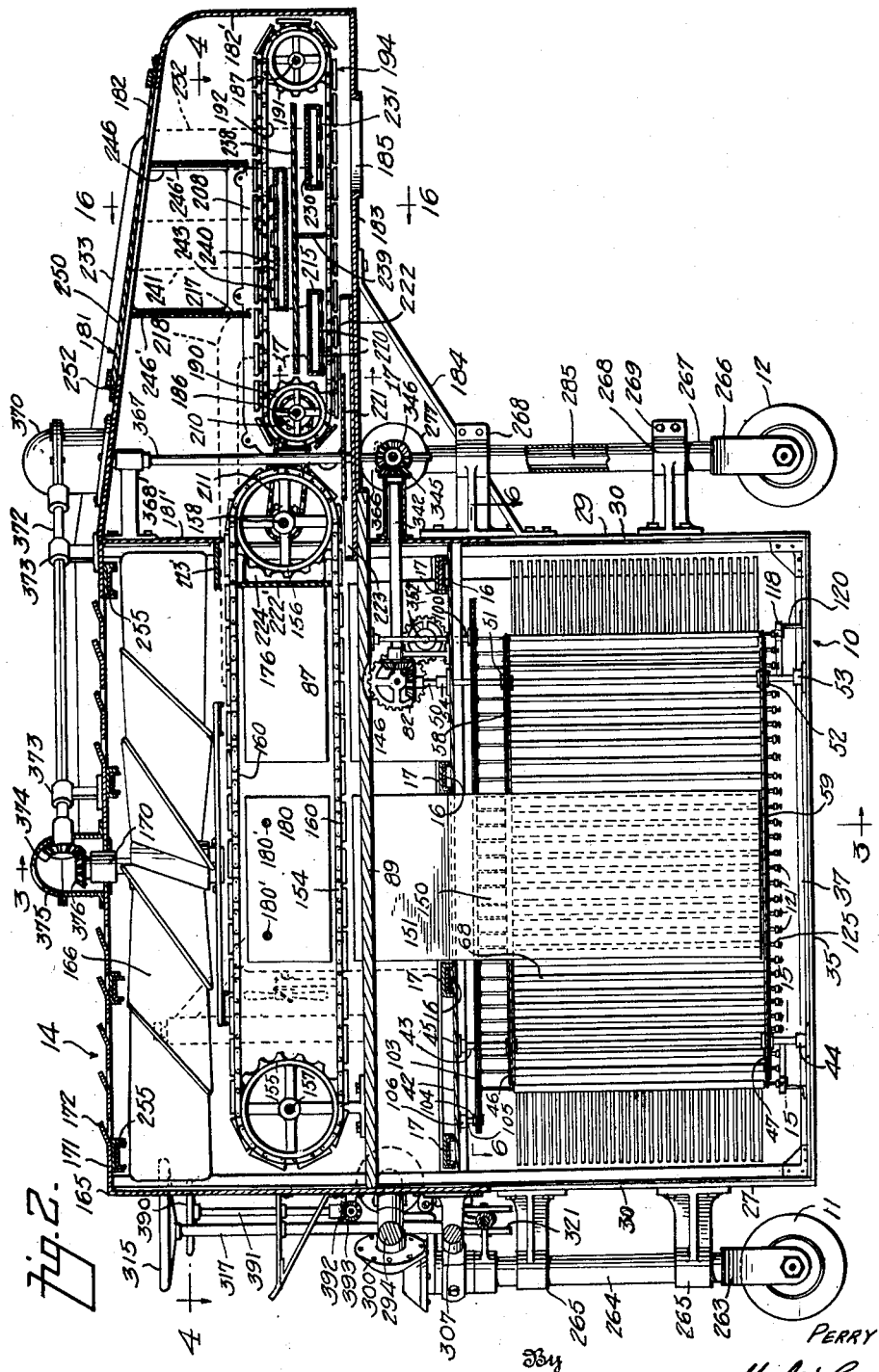

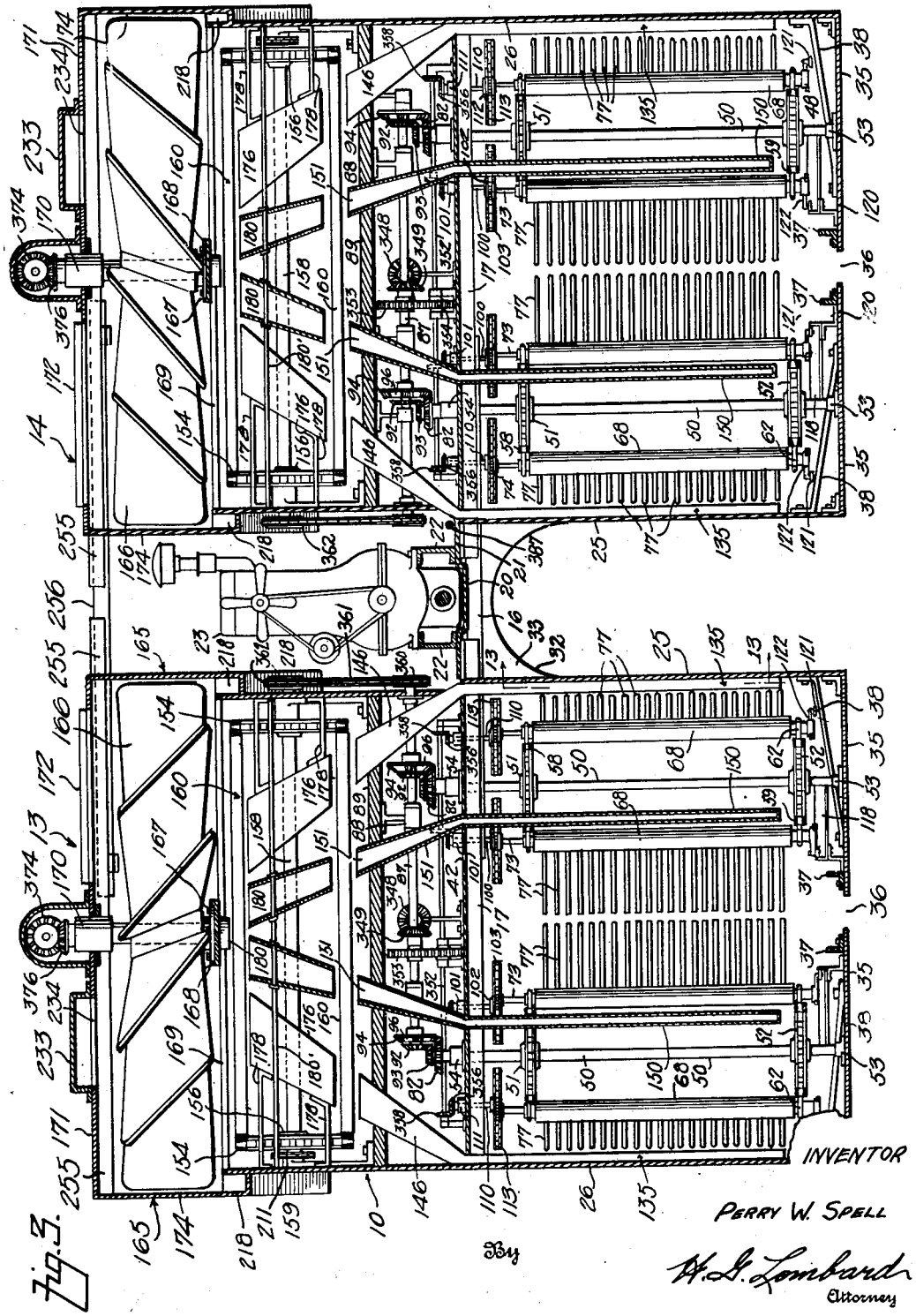

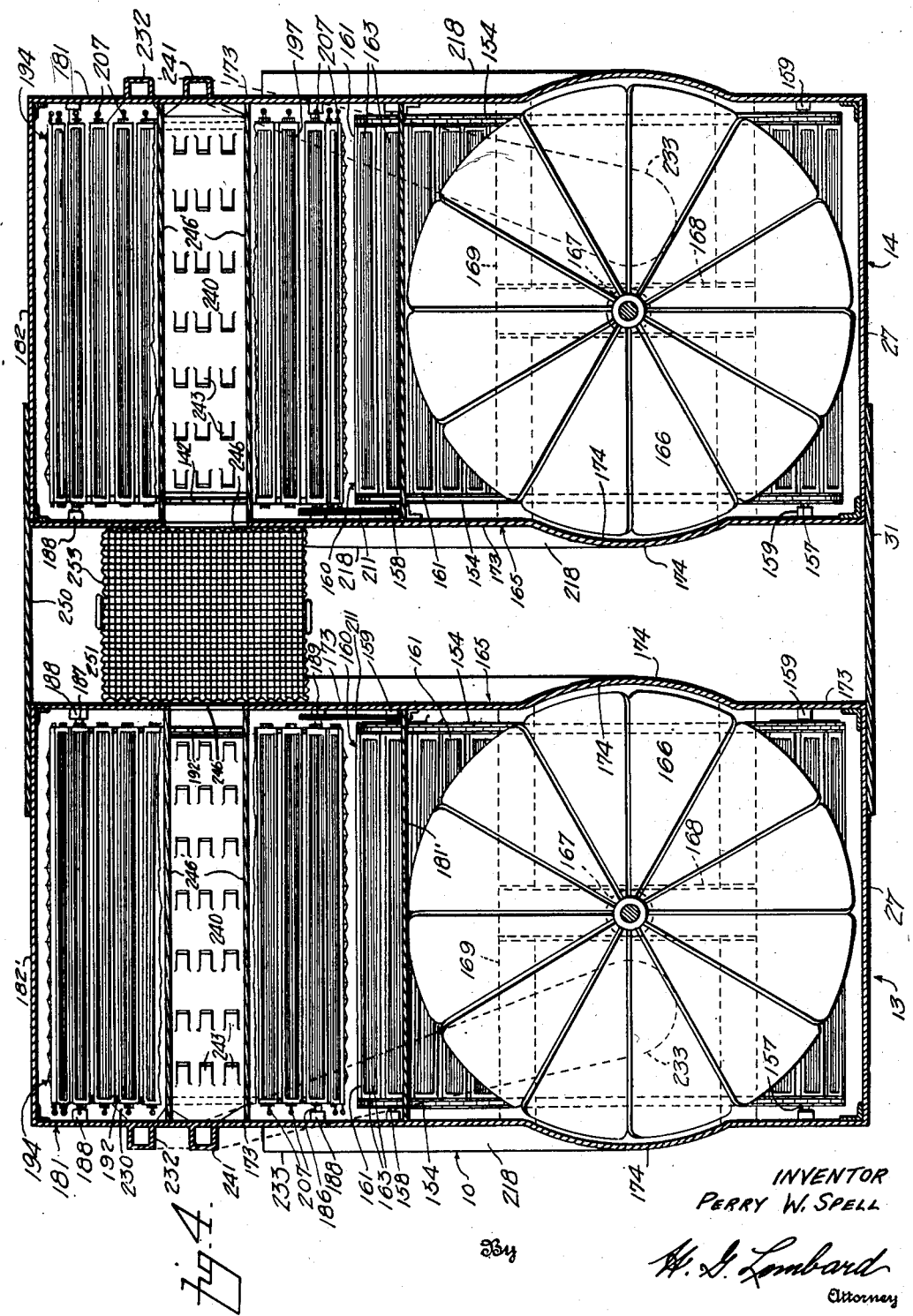

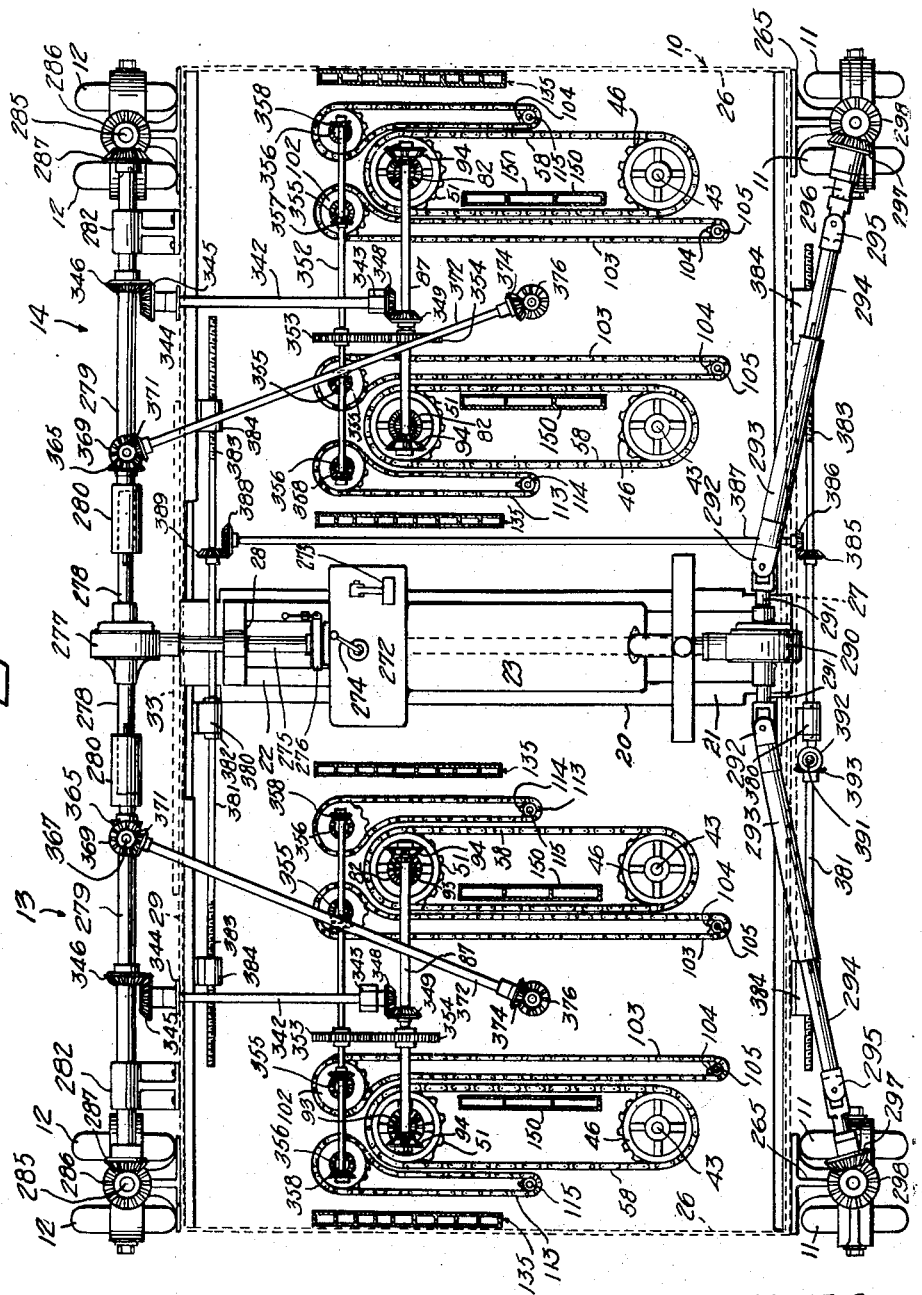

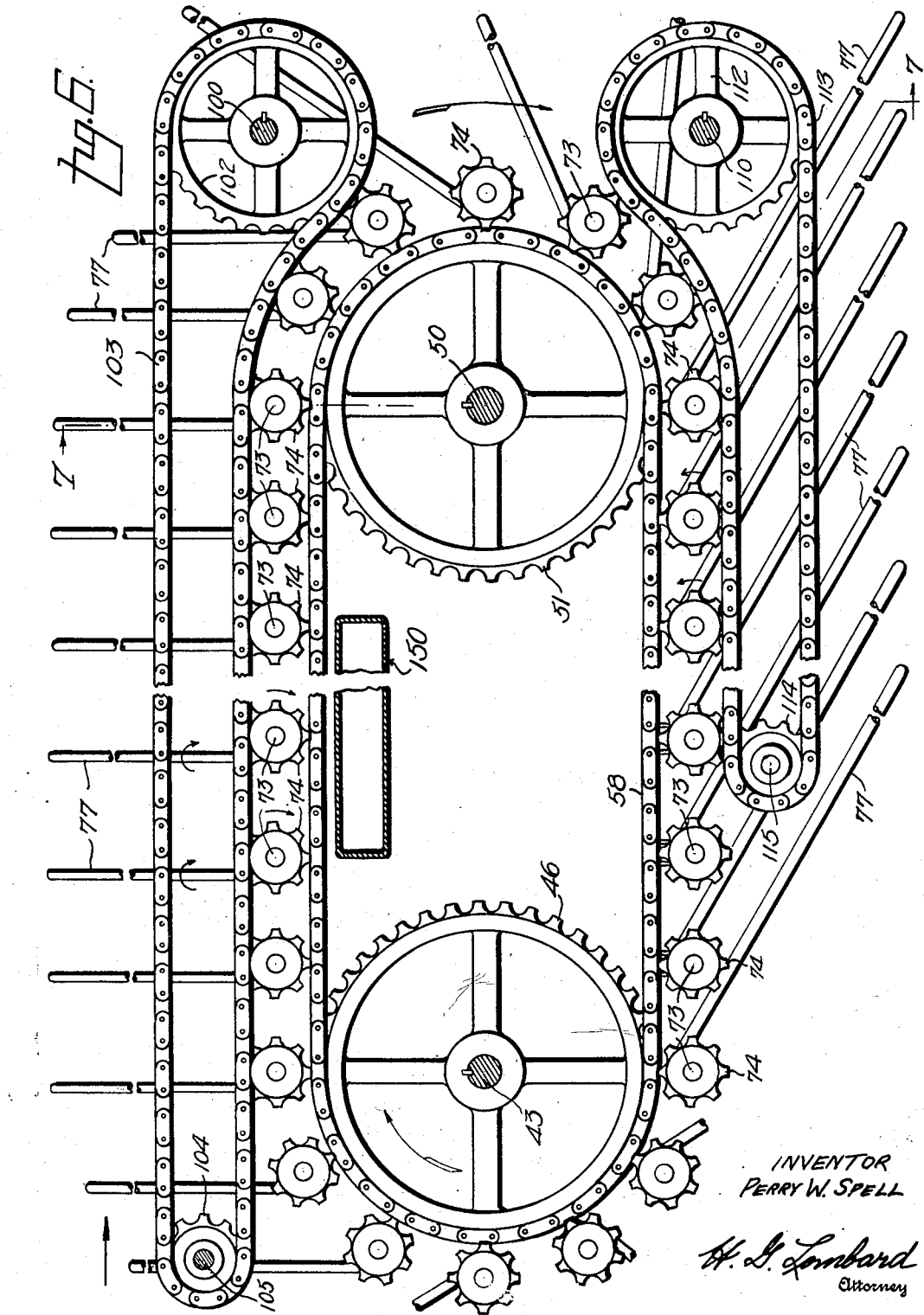

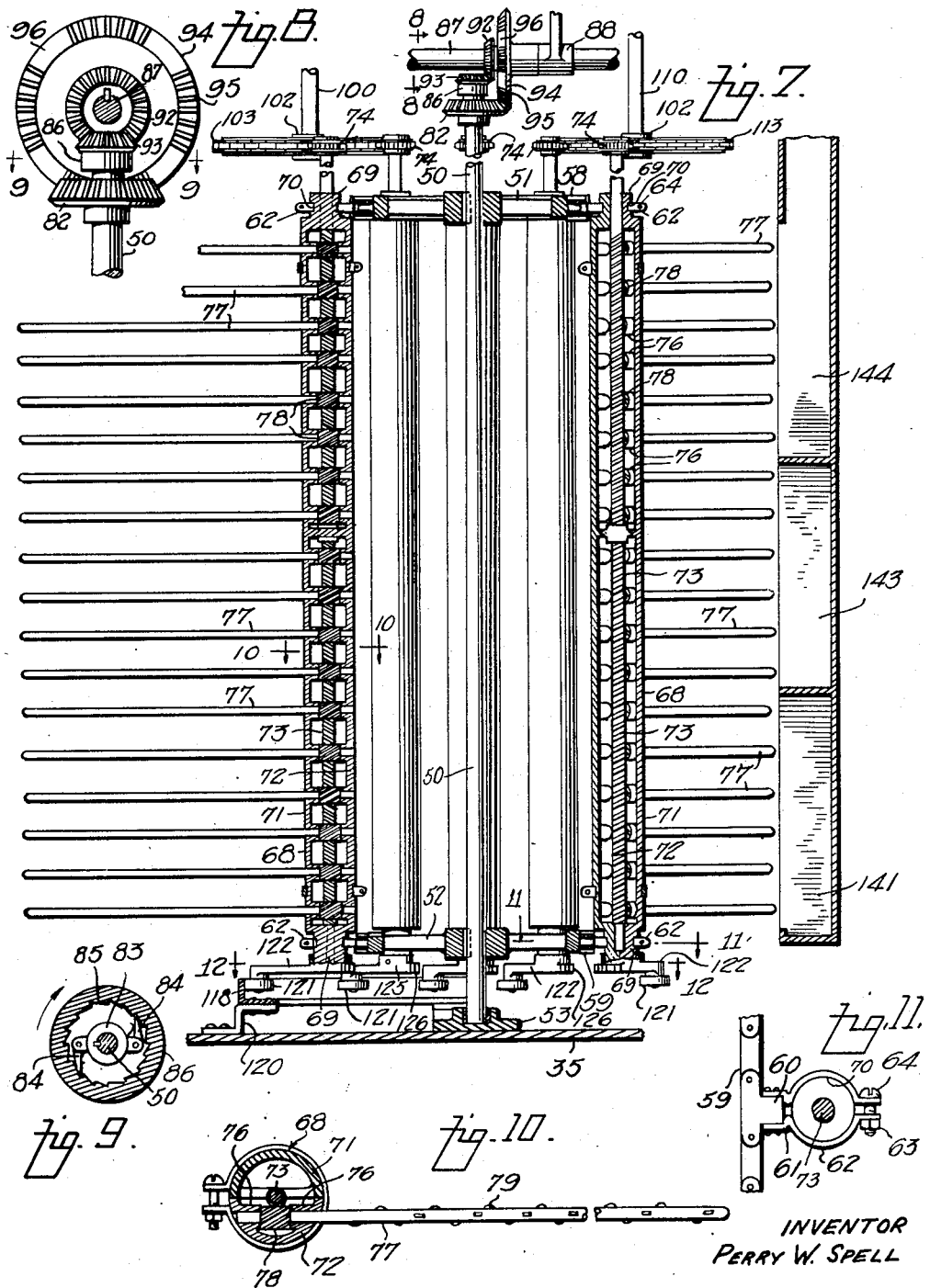

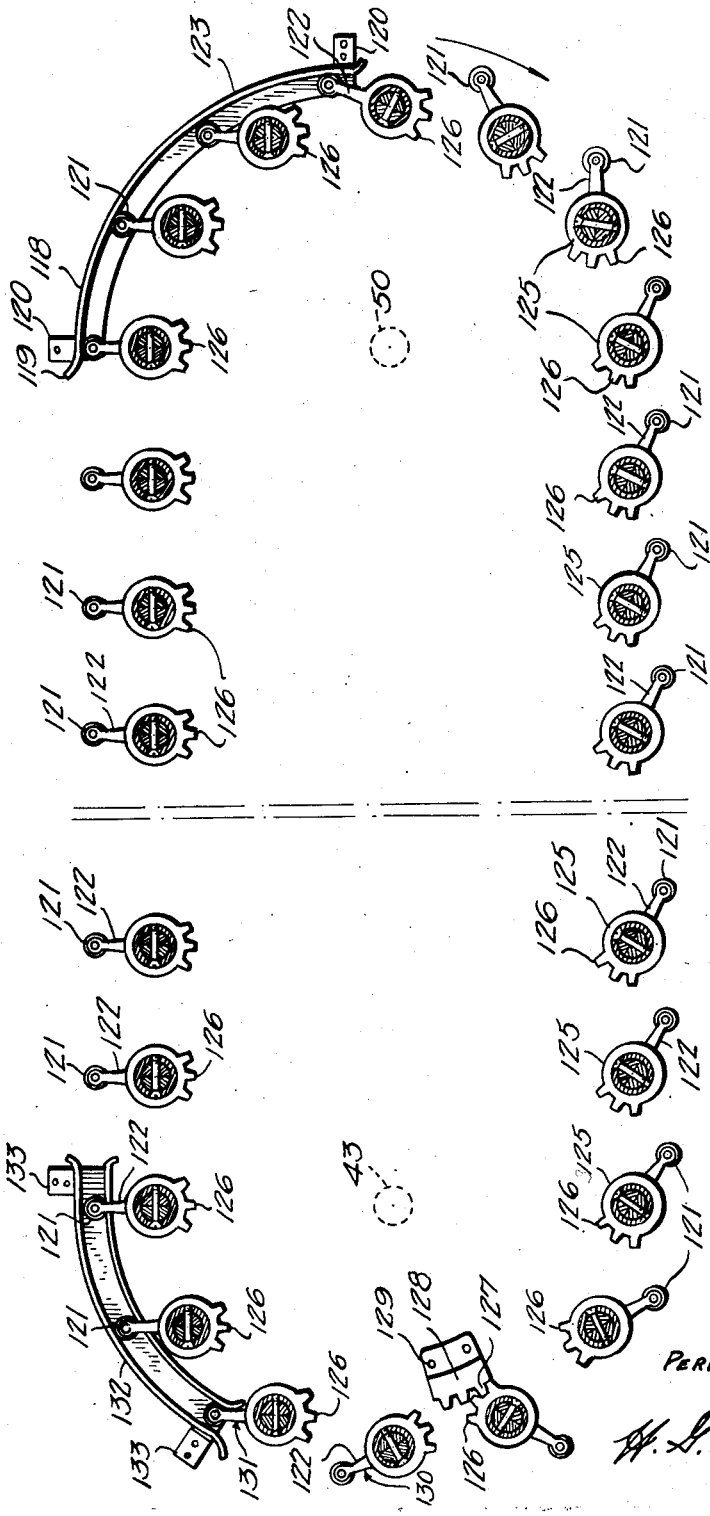

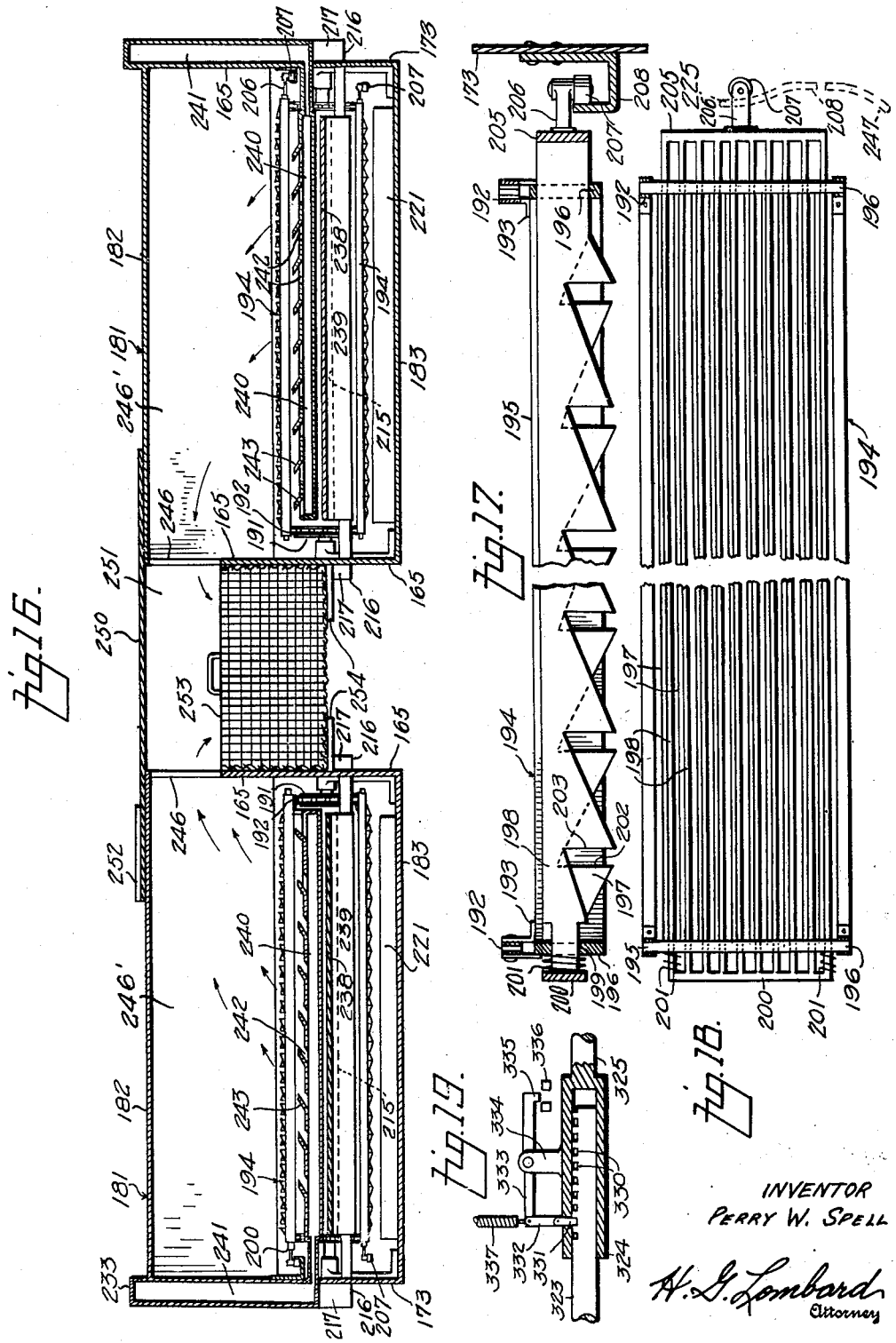

Patented Jan. 20, 1953

2,625,783

UNITED STATES PATENT OFFICE 2,625,783

COTTON-PICKING APPARATUS

Perry W. Spell, Roseboro, N. C.

Original application January 25, 1944, Serial No. 519,656. Divided and this application May 9, 1949, Serial No. 92,158

22 Claims. (Cl. 56—14)

This invention relates to cotton picking and cleaning apparatus.

It has been proposed to pick cotton from cotton plants by introducing into the plants sets of parallel horizontal rotating spindles which, as they contact the bolls, will wind the fibers of the cotton on the spindles and thus gather the cotton from the bolls. These machines have been reasonably successful so far as the actual picking of the cotton is concerned, but the subsequent gathering of the cotton from the spindles and the cleaning of the gathered cotton is accomplished only with substantial difficulty.

An important object of the present invention is to provide a cotton picking apparatus wherein the actual picking of the cotton from the plants is accomplished by bringing rotating spindles into contact with the cotton in the bolls, and to provide novel means for readily removing and recovering the cotton from the spindles together with means for cleaning the gathered cotton.

The present application is a division of prior copending application Serial Number 519,656 filed January 25, 1944, and which has since issued as United States Patent Number 2,471,842, May 31, 1949.

A further object is to provide novel means for gathering the cotton removed from the spindles, all of the cotton removed from the spindles being progressively removed to a single discharge point to be collected in a suitable receptacle.

A further object is to accomplish the removal of the cotton from the spindles by generating a flow of air along the spindles toward the free ends thereof by means of vacuum ducts having nozzles adjacent a path of travel of the free ends of the spindles remote from the plants, and to provide novel means associated with the ducts for catching the cotton and moving it away from the influence of the ducts and associated elements to facilitate the gathering of the cotton.

A further object is to provide novel means for mechanically engaging the gathered cotton and then effecting a flow of air through the cotton to remove a substantial proportion of foreign material from the cotton, after which the relatively clean cotton is conveyed to a receptacle to be collected.

A further object is to provide means for operating the mechanical engaging means to cause it to engage the cotton by a gripping action during the operation of removing foreign material from the cotton, and then to release the engaging means from the cotton and subsequently subject it to a flow of air to convey it to a collecting receptacle.

A further object is to provide a cotton picking apparatus of the character referred to wherein the vehicle carries two complete cotton picking units, and to so construct the vehicle as to provide for the adjustment of the units toward and away from each other in accordance with varying distances between rows of cotton plants.

A further object is to provide such an apparatus wherein all of the supporting wheels of the vehicle are positively driven from a single source of power regardless of the adjusted distance between the picking units.

A further object is to provide a novel steering mechanism for the wheels of the vehicle adjacent one end thereof, and to construct such steering mechanism as to provide for the adjustment of the picking units toward and away from each other.

Further objects and advantages of the invention, and other new and useful features in the construction, arrangement and general combination of parts thereof will be readily apparent as the following description proceeds with reference to the accompanying drawings, for purposes of illustration but not of limitation, in which like reference characters designate like parts throughout, and in which:

Fig. 1 is a front elevation of the apparatus;

Fig. 2 is a vertical longitudinal sectional view on line 2—2 of Fig. 1;

Fig. 3 is a transverse vertical sectional view on line 3—3 of Fig. 2;

Fig. 4 is a horizontal sectional view on line 4—4 of Fig. 2;

Fig. 5 is a plan view of the apparatus, the casing and other elements being omitted to show the various driving connections and other parts, the vacuum manifolds being shown in section;

Fig. 6 is an enlarged horizontal sectional view on line 6—6 of Fig. 2, parts being broken away.

Fig. 7 is an enlarged transverse vertical sectional view on line 7—7 of Fig. 6;

Fig. 8 is an enlarged fragmentary sectional view on line 8—8 of Fig. 7;

Fig. 9 is a similar view on line 9—9 of Fig. 8;

Fig. 10 is a similar view on line 10—10 of Fig. 7, parts being shown in elevation.

Fig. 11 is a similar view on line 11—11 of Fig. 7;

Fig. 12 is an enlarged horizontal sectional view on line 12—12 of Fig. 7, parts being broken away.

Fig. 13 is an enlarged fragmentary sectional view on line 13—13 of Fig. 3, parts being shown in elevation and parts being broken away;

Fig. 14 is an underside detail perspective view

Fig. 15 is an enlarged fragmentary sectional view of the same taken on line 15—15 of Fig. 14;

Fig. 16 is an enlarged transverse vertical sectional view on line 16—16 of Fig. 2;

Fig. 17 is an enlarged sectional view through the cotton engaging and holding means taken substantially on the line 17—17 of Fig. 2, parts being broken away;

Fig. 18 is a plan view of the same, the beginning and end portions of the operating cam for the gripping elements being shown in dotted lines; and Fig. 19 is an enlarged fragmentary detail sectional view showing the adjusting means for the steering mechanism.

Referring to Figs. 1 and 2, the numeral 10 designates the vehicle as a whole which carries and forms a part of the present invention. This vehicle is supported by pairs of dirigible front wheels 11, adapted to be steered in a manner to be described, and the rear end of the apparatus is supported by similar sets of wheels 12. The present apparatus comprises two cotton picking units generally designated respectively by the numerals 13 and 14 in Fig. 1 of the drawings. As will become apparent, these units simultaneously pick cotton from two rows of plants, the apparatus straddling one row of plants during the picking of the two rows on opposite sides thereof.

Means are provided for connecting the units 13 and 14 to each other and to provide for the adjustment of these units within reasonable limits to accommodate the apparatus to relatively slight difference in the spacing of the rows of cotton plants. At spaced points from front to back of the apparatus a plurality of transverse structural members 16 (Figs. 2 and 3) are slidably connected to similar structural elements 17 extending across the two picking units, the elements 16 and 17 preferably being channelled in cross-sectional shape as shown in Fig. 2 with the channels 16 extending within the respective channels 17. Means to be described later is employed for effecting movement of the units 13 and 14 toward and away from each other.

A relatively heavy plate 20 extends longitudinally of the apparatus across the tops of the structural member 16 and is secured thereto in any suitable manner. The longitudinal edge portions of the plate 20 are offset upwardly as at 21 (Fig. 3) to overhang and provide space for movement of the channel members 17. Parallel longitudinally extending frame members 22 are secured to the longitudinal edge portions of the plate 20. The frame members 22 support an internal combustion engine 23 which supplies power to propel the vehicle over the ground and to drive the various parts of the apparatus to be described. The various driving connections from the motor will be described later.

The picking units 13 and 14 are duplicates of each other and accordingly only one need be described in detail. Each unit comprises inner and outer walls 25 and 26 respectively (Fig. 3), a front wall 27 (Figs. 1, 2 and 5) and a rear wall 29. The front wall 27 is provided with an opening 30 (Figs. 1 and 2) through which the cotton plants are adapted to enter as the apparatus moves over the ground. The front walls of the two units lie behind a front wall 31 for the center of the apparatus, and this wall is provided with an opening 32, similar to the openings 30, except that it is substantially wider. One row of cotton plants moves through the opening 32 and thence through the center of the apparatus while the two picking units pick cotton from the two adjacent rows as will become obvious. The rear wall 29 of each picking unit obviously is also provided with an opening 30 (see Fig. 2). A center wall 33, similar to the wall 31, extends across the rear portion of the apparatus and also is provided with an opening 32. The walls 31 and 33 respectively overlap the front and rear walls 27 and 29 of the picking units, as shown in Fig. 4, to allow for the lateral adjustment of the units relative to each other, and the walls 31 and 33 may be connected to the ends of the plate 21 (Fig. 3) by any suitable means which need not be illustrated in detail.

Each of the units 13 and 14 also is provided with bottom wall elements 35 (Figs. 2 and 3) and the bottom wall elements of each unit have their inner edges spaced as at 36 for the movement of successive cotton stalks through each unit. As a part of the channel frame structure of each picking unit angle iron or similar structural elements 37 (Fig. 3) may extend from front to back of the apparatus to brace the bottom wall elements 35. Additional angle brace elements 38 also may be provided for this purpose in view of the load carried by the elements 35, as will become apparent.

Each of the picking units is provided with a plate 42 supported by and secured to the structural elements 17. The various driving elements for the picking units are supported by such plate as will become apparent. Adjacent its forward end each unit is provided with spaced vertical shafts 43 the lower ends of which are supported in bearings 44 (Fig. 2) carried by the plate 35, and the upper ends of which rotate in bearings 45 carried by the plate 42. Each of these shafts carries upper and lower sprockets 46 and 47 respectively. Similarly, each unit is provided with spaced vertical shafts 50 (Figs. 2 and 3) and each of these shafts carries upper and lower sprockets 51 and 52 respectively. The lower end of each shaft 50 is supported in a bearing 53, similar to the bearings 44 and likewise supported by the plate 35. Each shaft 50 extends upwardly through the plate 42 and is rotatable in a bearing 54 carried by the plate 42. Each shaft 50 of each picking unit is driven in a manner to be described.

A chain 58 passes around each sprocket 46 and its corresponding rear sprocket 51 (Figs. 2, 6 and 7) and a similar lower chain 59 passes around each lower sprocket 47 and its corresponding rear sprocket 52. The picking mechanism associated with each pair of chains 58 and 59 of each unit are identical with each other and only one such mechanism need be described in detail. Referring to Figs. 6 and 11, it will be noted that certain of the filler links of the chains 58 and 59 are provided with outstanding lugs 60 and each of these lugs has secured against opposite sides thereof the ends 61 of brake bands 62. The opposite ends 63 of these bands may be contracted by a bolt 64 to vary the braking action for a purpose to be described.

A plurality of vertical tubes 68 (Fig. 7) extend between the chains 58 and 59, these tubes being vertically arranged and each corresponding in position to an upper and lower brake device as just described. Each tube 68 carries a head 69 at each end thereof, and each of these heads is annularly grooved as at 70 to receive one set of the brake bands 62. The arrangement of these brake bands in the grooves described provides means for supporting the tubes 68 relative to the chains, and at the same time provides means for resisting turning movement of the tubes. The purpose of this arrangement will be referred to later.

Each of the tubes 68 is formed of longitudinal complementary sections 71 and 72 as shown in Fig. 10. The heads 69 form bearings to rotatably support a screw 73 arranged axially of each tube 68 and provided at its upper end with a sprocket 74 (Figs. 6 and 7). Each of the tube sections 72 is provided with bearing elements 76 rotatably supporting a picker spindle 77, the latter having one end projecting through a pair of the bearing elements 76 as shown in Fig. 10 and carrying a worm 78 between such bearing elements meshing with the screw 73. It is obvious, therefore, that each picker spindle 77 will be rotated by one of the worms, the picker spindles being arranged in groups of a substantial number each, horizontally arranged and slightly spaced from each other as shown in Fig. 7. The spindles 77 perform the actual picking operation and may be suitably roughened as at 79 to more effectively engage the cotton in the bolls whereby the cotton may be wound on the spindles and thus pulled from the bolls. It will become apparent later that the chains 58 and 59 are driven at such speed that the net speed of movement of the picker spindles relatively rearwardly of the apparatus in the operative runs of the chains is approximately equal to the speed of movement of the vehicle over the ground, but relatively in the opposite direction, so that the spindles do not move to break down or damage the stalks of the cotton plants. During such operation, the picker spindles 77 are constantly rotated to effect the picking of the cotton from the plants.

While the net speed of movement of the spindles 77 in their operative path of travel approximately equals the speed of movement of the vehicle, a more efficient picking operation can be accomplished by causing the spindles to travel alternately faster and slower than the speed of the vehicle to thus "play" back and forth between the plants to insure contact of the spindles with the cotton bolls. Otherwise, a vertical row of spindles might enter a row of plants, in a manner to be described, centrally between a pair of plants without being brought into substantial contact therewith. The means for alternately accelerating and retarding the speed of bodily movement of the spindles is shown in Figs. 7, 8 and 9. Each shaft 50 is provided adjacent its upper end with a gear 82 (Figs. 2, 3, 7 and 8), the gear 82 being fixed to the shaft 50. Above the gear 82, a collar 83 (Fig. 9) is fixed to the shaft 50 and carries outwardly spring pressed pawls 84 engageable with ratchet teeth 85 formed within a sleeve 86 which is freely rotatable relative to the shaft 50.

A transversely extending shaft 87 is provided for driving the two picker mechanism of each picking unit. This shaft is supported by suitable bearings 88 which may be carried by a horizontal partition 89 spaced above and parallel to the plate 42. The shaft 87 of each picking unit is driven from the motor 23 in a manner to be described. Each end of the shaft 87 of each picking unit is provided with identical means for driving the shafts 50 of the associated picking units. Accordingly only one such means need be described. Referring to Figs. 7 and 8, the shaft 87 is provided with a bevel pinion 92 meshing with a bevel pinion 93 carried by the sleeve 86. The pinion 92 is fixed to the shaft 87 and thus constantly drives the pinion 93, but the sleeve 86 is free to rotate in one direction relative to the shaft 50 and accordingly the sleeve is not constantly driven by the shaft 87.

The shaft 87 carries a substantially larger mutilated bevel gear 94 having sets of teeth 95, and the ends of these sets of teeth are separated from each other as at 96. The teeth 95 engage the bevel gear 82 as shown in Figs. 7 and 8. It will be obvious that the spacing of the sets of teeth 95 provides means for successively driving and releasing the gear 82. The driving ratio between the gear 94 and gear 82 being substantially greater than the driving ratio between the pinions 92 and 86, it will be apparent that when the teeth 95 engage the gear 82 the shaft 50 will be positively driven at a speed greater than the rotational speed of the gear 93. During such periods, the pawls 84 (Fig. 9) will escape over the ratchet teeth 85. After each set of teeth 95 passes out of engagement with the gear 82, the pawls 84 will be engaged by the teeth 85 to drive the shaft 50. The rotational speed of the shaft 50 under the latter condition will be such that the spindles 77 in their operative paths of travel will move relatively rearwardly of the apparatus at a speed somewhat less than the speed of movement of the vehicle over the ground. When the shaft 50 is driven by the teeth 95, the movement of the spindles 77 relatively rearwardly will be slightly greater than the speed of movement of the vehicle. Thus, while the net rearward speed of the spindles equals the forward constant speed of the vehicle, the spindles will be moving alternately faster and slower, and thus will "play" back and forth between the cotton plants of the associated row.

It will be apparent that the chains 58 and 59 cause the tubes 68, spindles 77 and associated elements to partake of bodily movement in accordance with the paths defined by the chains. One run of the chains moves rearwardly relative to the vehicle at the side of the picking mechanism adjacent the picking mechanism of the corresponding unit, and this is the operative run of the chains. These runs of course will be adjacent the row of plants as will be obvious from an examination of Fig. 3. Remote from the cotton plants, the chains partake of a return or inoperative run. During the operative runs of the chains the spindles 77 are rotated in one direction to gather cotton from the bolls of the plants, while in the inoperative runs of the chains cotton is removed from the spindles in a manner to be described and such removal is facilitated by oppositely rotating the spindles.

Referring to Figs. 2, 3, 5, 6 and 7, the numeral 100 designates a shaft associated with each picking mechanism of each unit and journalled in a bearing 101 carried by the plate 42. This shaft is driven from the power source 23 in a manner to be described. The shaft 100 carries a sprocket 102 (Fig. 6) around which passes a chain 103 and this chain engages the sprockets 74 at the operative side of the chain 58. The other end of the chain 103 of each picker unit passes around a sprocket 104 mounted on a shaft 105 journalled in a bearing 106 carried by the plate 42. This mechanism will drive all of the screw shafts 73 (Figs. 6 and 7) throughout the operative runs of the chains 58 and 59, and these screw shafts will rotate their associated spindles 77.

A chain mechanism substantially identical with that described for rotating the screw shafts 73 is employed in the return runs of the chains 58 and 59 to rotate the screw shafts 73 and spindles 77 in the opposite direction. Referring to Figs. 6 and 7, a shaft 110 is journalled in a bearing 111 carried by the plate 42 and carries a sprocket 112 about which passes a chain 113, and this chain engages a substantial number of the sprockets 74 associated with the return runs of the chains 58 and 59. The chain passes around a sprocket 114 carried by a shaft 115 also suitably supported by the plate 42. The shafts 100 and 110 are driven in the same direction but their respective chains engage relatively opposite sides of the sprockets 74, and accordingly the chains 103 and 113 rotate their associated shafts 73, and consequently the spindles 77, in opposite directions.

It is desirable to "feather" the spindles 77 into the cotton plants at the points where the spindles enter the row at the forward end of the apparatus, that is, at the left hand end of the structure shown in Fig. 6. It is similarly desirable to move the spindles out of the row of plants in the same manner to prevent striking against the plants and damaging them. At the same time it is desirable that the spindles in the operative runs of the chains extend perpendicular to the row of plants being worked, and that the spindles be swung at an angle in the return runs of the chains to minimize the space required for the ends of the spindles in the return runs of the chains. Such arrangement permits using casing walls 26 close enough to the center of each picking unit to avoid interfering with the next adjacent rows on opposite sides of the apparatus.

Mechanism for the purpose stated is shown in Figs. 3 and 12, and particularly in Fig. 12. Adjacent the rear or right hand end of the operative runs of the chains is arranged a cam 118 (Fig. 12) having its entrance end slightly curved outwardly as at 119. This cam is carried by bracket elements 120 secured against the bottom plates 35 of each picker mechanism. The cam 118 engages a roller 121 carried by an arm 122 fixed to and projecting from the lower head 69 of each of the tubes 68 (Fig. 7). The cam 118 is so designed that when each arm 122 reaches a position in alinement with the axis of the shaft 50 (Fig. 12) the cam 118 will engage the roller of such arm. Continued movement of the parts will result in movement of such roller 121 and its arm to the left as viewed in Fig. 12 to impart counter-clockwise rotation to the associated tube 68. The successive arms 122 will move around the rear ends of their paths of travel without changing their perpendicular relation to the row of cotton being worked until they reach approximately the point indicated by the numeral 123 in Fig. 12. At this point the arms 122 will have been turned as far as practicable and the cam 118 from this point to its discharge end permits the arms 122 to alter their positions more gradually until they reach the angular position indicated by the arm 122 against the lower or discharge end of the cam 118 in Fig. 12.

It will be apparent that the turning movement of the arms 122 also swings the spindles 77, the spindles of each tube 68 being in vertical alinement with each other and with their corresponding arm 122. Thus the spindles move out of the row of plants in the manner indicated in Fig. 6. The turning movement of the tubes 68 takes place against the frictional resistance offered by the brake bands 62 (Fig. 11).

From the discharge end of the cam 118 of each picking unit, the associated elements 122 project at a substantial angle with respect to their original positions, as will be apparent. These positions are maintained throughout the return runs of the associated chains 58 and 59. Therefore, in the return runs of the chains the spindles 77 occupy the parallel angular positions shown at the bottom of Fig. 6, thus minimizing the distance from the axes of the screw shafts 73 to the extremities of the spindles 77 in a direction perpendicular to the direction of movement of the vehicle. This arrangement permits the opposite walls 25 and 26 (Fig. 3) of each picking unit to be arranged closer together and thus permit narrower picking units to be employed and avoid striking and breaking the adjacent plants.

As previously stated it is desired to move the spindles 77 into the rows being picked at an angle perpendicular to the rows to avoid any swinging of the spindles as they pass around the sprockets 46 (Fig. 6) since such operation would cause the spindles to strike against the plants and break or damage them. Referring to Fig. 12, each arm 122 carries a circular portion 125 and at the side of such portion opposite the corresponding arm 122 is formed a series of gear teeth 126 adapted to mesh with the corresponding teeth 127 carried by a plate 128 secured as at 129 to the associated bottom plate 35. As the successive tubes 68 pass around the sprocket 46, the teeth 126 will engage the teeth 127 to swing the successive tubes 68 in a clockwise direction until the arm 122 of each successive tube 68 assumes the position indicated by the numeral 130 at the left hand end of Fig. 12. The picking spindles 77 of such tube will occupy the same angular position.

After the tube 68 has been moved so that its arm 122 and spindles 77 occupy the position indicated by the numeral 130, movement of the corresponding tube 68 a distance approximately equal to the distance between an adjacent pair of spindles will bring such tube to the position indicated by the numeral 131 in Fig. 12, in which position the arm 122 and spindles 77 will be arranged approximately perpendicular to the row of plants from which cotton is being picked. At such point, the roller 121 associated with the tube 68 being considered will engage a substantially U-shaped cam trackway 132 secured to the associated plate 32 by bracket elements 133. The cam trackway 132 is so shaped that the spindles 77 associated with the rollers 121 passing therethrough will be held perpendicular to the row of plants until the plane of the associated spindles 77 coincides with the axis of the shaft 43. At such point each successive roller 121 will be released from the cam trackway 132 and the spindles 77 will move in the operative runs of the chains 58 and 59 while remaining perpendicular to the row of cotton plants.

In this connection it will be apparent that the turning movements of the tubes 68 effected by the gear teeth 126 and 127 and by the cam trackway 132 will take place against the resistance of the brake devices shown in Fig. 11. These brake devices likewise frictionally, but not positively, hold the plane of each set of spindles 77 perpendicular to the row of plants, but substantial contact of the spindles with a plant can turn them against the resistance of their brake devices to whatever extent is necessary to avoid damage to the plants. It will be apparent that such turning movement will always be minor in extent since the net speed of movement of the spindles 77 in the operative runs of the chains rearwardly of the apparatus is equal to the forward speed of the vehicle.

The apparatus is provided adjacent and within each of the walls 25 and 26 (Fig. 3) of each of the picking units with means for removing cotton from the spindles 77 in the return runs of the chains 58 and 59 while the spindles are rotated by the chains 113 in a direction opposite to the direction of rotation imparted to the spindles by the chains 103. Referring to Figs. 3, 7 and 13, the numeral 135 designates a vacuum manifold arranged within and against each of the walls 25 and 26. These manifolds are identical and only one need be described in detail. Each manifold 135 is formed of three sections indicated by the brackets 136 in Fig. 13. Each of the sections 136 includes vertical side ducts 137 and 138 and a central duct 139. The side duct 137 extends to the bottom of the section and then laterally as at 140 to communicate with an opening 141. The other side duct 138 extends vertically downwardly as shown at the left hand side of Fig. 13, and then laterally as at 142 to communicate with a central opening 143 directly above the opening 141. The central duct 139 extends downwardly to terminate above the offset 142 and communicates directly with an opening 144. It will be noted that the openings 141, 143 and 144 of each section are in vertical alinement with each other. The distance from the top of each opening 144 to the bottom of each opening 141 is preferably slightly greater than the distance between the uppermost spindle 77 (Fig. 7) and the lowermost spindle of each set. Means are provided for effecting a rapid exhaust of air from the ducts 137, 138, 139 to cause exhaust air from the interior of the casing of each picking unit, and this operation effects a flow of air along the spindles 77 of each group toward the free ends thereof as the latter pass each set of openings 141, 143 and 144. This movement of air takes place during the reverse rotation of the spindles as effected by the chains 113 (Fig. 6), such reverse rotation tending to loosen and unwind the picked cotton while the flow of air along the spindles feeds the loose cotton along the spindles and thence to the openings 141, 143 and 144. The upper end of each manifold 135 communicates directly with the lower end of a duct 146 (Fig. 3) which tapers to increase in width toward its upper end and is inclined inwardly for a reason to be referred to later. Each duct 146 extends through the plate 89 as shown in Fig. 3.

Within the runs of each chain of each picking mechanism is arranged a manifold 150 similar to the manifold 135 and having the openings corresponding to the openings 141, 143 and 144 facing toward and arranged adjacent the operative runs of the chains 58. Inasmuch as these manifolds are preferably identical with the manifolds 135 they have not been illustrated in detail. The manifolds 150 have their upper ends directly communicating with flared ducts 151 extending through the partition 89. The function of the vacuum manifolds 150 is to effect a flow of air away from the free ends of the spindles 77 to assist in pulling the cotton being picked to the spindles 77 and to tend to swing branches of the cotton plants laterally to better assure the contact of the spindles 77 with all of the bolls. Any cotton which may find its way into the manifolds 150 will be collected in the same manner as cotton moving through the manifolds 135, as will become apparent.

Above the partition 89 is arranged a pair of chains 154 passing around sprockets 155 and 156 carried by shafts 157 and 158 (Figs. 2 and 3). These shafts are arranged in horizontal alinement and are journalled in bearings 159. The chains carry therebetween a plurality of cotton gathering frames 160 (Figs. 2, 3 and 14). Each of these frames comprises a frame element 161 which is preferably rectangular and elongated transversely of the apparatus. The frame elements are of such width as to permit each of them to be supported by the pivot pins 162 of alternate pairs of links of the chains 154 as shown in Fig. 14. Each frame element 161 carries a plurality of closely arranged blades 163 (Figs. 14 and 15) these blades being arranged parallel to the long sides of the frame elements 161. The frames 160 form, in effect, an endless collecting screen through which the cotton cannot pass, without providing any elements to which the cotton can adhere or around which it can become tangled as would be true of an ordinary wire screen. The lower runs of the chains 154, as shown in Figs. 2 and 3, pass over the partition 89 parallel thereto and just above the upper ends of the flared ducts 146 and 151. The cotton moving upwardly through ducts 146 will be gathered on the bottoms of the lower frames 160 as the latter move with the chains 154. Any cotton which should happen to pass upwardly through the ducts 151 will be similarly gathered by the frames 160.

Above the chains 154 of each gathering unit is formed a housing 165 in which is arranged a large fan 166. The fan 166 has its shaft journalled in a lower bearing 167 having opposite projections 168 (Fig. 4) supported by transverse members 169 anchored at their ends to opposite sides of the housing 165. The shaft of the fan also is supported in a bearing 170 (Fig. 3) carried by the top wall 171 of the housing 165. The fan is driven in a manner to be described.

It will be noted that the top wall 171 of the housing 165 is provided with louvers 172 for the relatively free escape of air upwardly from the apparatus as pumped by the fan. The housing 165 has its opposite sides 173 transversely of the apparatus relatively flat except that it is bulged as at 174 to receive the diametrically opposite extremities of the fan 166. The bulged portions 174 project beyond the side walls 25 and 26 to provide overhangs for a purpose to be described.

The fan 166 operates to create the vacuum necessary for the functioning of the manifolds 135 and 150 and the ducts 146 and 151 associated therewith. In order to increase the efficiency of the apparatus so far as the vacuum is concerned, by providing for a direct flow of air from the ducts 146 and 151 to the fan 166, a pair of flared ducts 176 is preferably arranged between the runs of the chains 154 and are secured to the side walls 26 by suitable brackets 178. These brackets project between the runs of the chains 154 as shown in Fig. 3. Similar flared ducts 180 serve the same purpose with respect to the ducts 151 and are secured to the side walls 26 by rods 180' secured to the side walls 26. It will be apparent that except for the break required for the frames 160 in the lower runs of the chains 154, the ducts 151 and 180 are substantial continuations of each other, and the same is true of the ducts 146 and 176.

The casing 165 is connected to a rearwardly extending casing 181 the interior of which is separated from the fan casing by a vertical cross partition 181' except for the projection of the chains 154 and associated elements beneath the lower edge of the partition 181'. The casing 181 is provided with an upper wall 182 which slopes downwardly and rearwardly as shown in Fig. 2 to form a rear wall 182'. The casing 181 is likewise provided with a bottom wall 183 and the casing 181 is connected to the main housing portions of the apparatus and is braced as at 184 with respect thereto. The bottom wall 183 is provided with a relatively large opening 185 for a purpose to be described.

Within the casing 181 is arranged a pair of spaced horizontal shafts 186 and 187 journalled at their ends in bearings 188 arranged adjacent the side walls 173 which extend rearwardly to form the side walls of the casing 181. The shafts 186 and 187 are respectively provided with sprockets 190 and 191 and spaced chains 192 pass around these sprockets. The chains 192 have alternate links thereof connected as at 193 (Fig. 17) to cotton engaging and holding devices 194 which are somewhat similar to the frames 160 previously described and define a second endless screen. Each device 194 comprises a rectangular frame 195 similar to the frame 161, each frame 195 being elongated transversely of the apparatus and each being arranged in close proximity to the next adjacent frame. Each frame 195 includes end members 196 (Fig. 18) which carry pairs of cotton engaging and holding members 197 and 198. The members 197 are fixed to the end members 196 while the members 198 are slidable in openings 199 formed in the end members 196 as shown in Fig. 17.

The members 197 and 198 are made from the same material as the members 163 (Figs. 14 and 15), being relatively wide and thin, and each member 198 is arranged in face to face sliding relationship with its associated member 197. At one side of each frame member the members 198 are connected by a header 200 and springs 201 urge the members 198 in one direction for a purpose to be described. Each member 197 is cut in its lower edge in saw tooth formation having vertical edges 202 defining cotton engaging and holding teeth facing in one direction. Each member 198 is similarly saw toothed, but in the opposite direction, to provide vertical edges 203 defining cotton engaging and holding teeth facing the respective edges or teeth 202 to grip cotton therebetween under the influence of the spring pressure exerted by the springs 201.

The ends of the members 198 opposite the header 200 are connected by a similar header 205 carrying a projecting arm 206 on the free end of which is journalled a roller 207. This roller is engaged by a cam trackway 208 during a portion of the travel of the chains 192 as will be particularly described later.

Any suitable means may be provided for driving the chains 192. For example, the shafts 158 and 186 of each picking unit may be provided with sprockets 210 around which pass a chain 211. The means for driving the chains 154 will be referred to later.

A vacuum manifold 215 (Figs. 2 and 16) extends transversely of each chamber 181 adjacent and just above the lower runs of the cotton collecting devices 194. The opposite ends of the manifolds 215 are connected to ducts 216 extending through the respective walls 165 and 173. After extending through these walls the ducts 216 turn upwardly as at 217, and then forwardly as at 218 (Figs. 2, 3 and 4). At their forward ends, the ducts 218 turn upwardly and communicate with the chamber beneath the fan 166 but extending through the overhang provided by the bulged wall 174. Accordingly the opposite peripheral portions of the fan 166 will be effective for exhausting air from the manifold 215 to maintain a partial vacuum therein, and this manifold is provided in its bottom wall with openings 220 (Fig. 2) adjacent the tops of the lower runs of the cotton collecting devices 194.

Each cotton picking unit is provided with a duct 221 (Figs. 2 and 16) overlying the bottom wall 183 of the chamber 181 and having its forward end overlying the partition 99. The rear end of the duct 221 has its top side open as at 222 beneath the bottom runs of the cotton collecting devices 194 and opposite the manifold 215. The forward end of the duct 221 has its top open as at 223 adjacent the right hand extremity of the lower runs of the cotton collecting members 169. A partition 222' extends vertically between the upper and lower runs of the cotton collecting members 169 and above the upper run of these collectors a horizontal partition 223' extends forwardly from the wall 181'. The partitions 222' and 223' are spaced apart only sufficiently for the passage of the successive members 169 therebetween to block off the chamber to the right of the partition 222' from the partial vacuum created beneath the fan 166. The side walls 26 and 27 of the unit are provided with air openings 224 for the flow of air into the chamber referred to, thus insuring a passage of air downwardly through the collecting members over the duct opening 223. Thus the cotton collected against the members 169 will be forced into and through the duct 221. The cotton moving through and from the rear end of the duct 221 will collect against the collecting devices 194 as these devices successively pass beneath the manifold 215.

It is during the movement of the collecting devices 194 beneath the manifold 215 that the gripping edges 202 and 203 (Fig. 17) are brought into play. As such point is approached, the roller 207 of each cotton collecting device will move from the discharge end 225 (Fig. 18) of the cam 208, thus releasing the slidable members 198 to be moved toward the left as viewed in Fig. 17 by the springs 201. The cotton moving against the bottoms of the cotton collecting devices will have portions thereof gripped between the edges 202 and 203 and the cotton will be held in position against the gripping devices until the cam 208 again moves the slidable elements 198 to a released position, as will be described.

With cotton held by the collecting devices as they move toward the right in Fig. 2 from beneath the manifold 215, such devices and the cotton held thereby will pass beneath a manifold 230 (Fig. 2) extending transversely between the upper and lower runs of the chains 192 and having openings 231 in the bottom thereof adjacent the lower engaging devices 194 by which the cotton is being held. One end of each manifold 230 communicates with a vertical duct 232 (Figs. 2 and 4) and this duct directly communicates with a top duct 233 arranged on and extending over the top wall 182 of the chamber 181 and the top wall 171 of the fan housing. The ducts 233 of the two picking units extend inwardly across the top walls referred to at angles as shown in Fig. 1 and communicate with the pressure side of the fan housing 165 through openings 234 (Fig. 3). Accordingly the fan will pump air through the ducts 233 and 232 and this air will be discharged downwardly through the manifolds 230 of the two units. This discharged air is forced downwardly through the cotton being carried by the devices 194 and is discharged through openings 185. The purpose of this flow of air is to remove sticks, leaves and other foreign matter from the cotton.

A horizontal partition 238 is arranged between the upper and lower runs of the chains 192 (Fig. 2) above the manifolds 215 and 230 and a vertical partition 239 extends downwardly between these two manifolds to prevent them from interfering with each other in their operations. Above the partition 238 is arranged a horizontal manifold 240 extending transversely of each picking unit as shown in Fig. 16. The manifold 240 has one end connected to a vertical duct 241 tapped into the associated duct 233 so that air also flows into the manifold 240. The top of this manifold is provided with openings 242 having louvers 243 inclined upwardly at an angle toward the center of the apparatus as shown in Fig. 16.

Each wall 165 (Figs. 4 and 16) is provided with a discharge opening 246 for the discharge of cotton from the upper engaging members 194. In this connection it will be noted that the cam 208 has its entrance end 247 arranged at the approach side of the manifold 240 and opening 246 to engage the roller 207 of each successive device 194 to pull the slidable elements 198 to the cotton releasing position against the tension of the springs 201 as each device 184 comes to a position between the manifold 240 and opening 246. The air flowing upwardly through openings 242, therefore, will blow the released cotton upwardly and toward the center of the apparatus for discharge through the openings 246 of the two units. Each unit preferably has spaced partitions 246' (Figs. 2, 4 and 16) to confine the cotton for movement to the openings 246.

The top walls 182 of the chambers 181 support a cover plate 250 covering the space 251 between the walls 173. The cover plate 250 may be secured at one side of the top wall 182 of one of the picking units and may be slidable in guides 252 (Fig. 2) carried by the top wall 182 of the other unit so as to allow for relative movement of the units toward each other. The cover plate 250 prevents cotton from being blown out of the top of the space 251. A relatively long basket 253 is arranged in the space 251 and is supported on flanges 254 carried by the walls 165. The basket 253 is of substantial length as shown in Fig. 4, the front and rear ends of the basket extending substantially beyond the front and rear limits of the openings 246 to prevent cotton blown through the openings 246 from dropping beyond the ends of the basket. While the sides of the basket have been shown in Figs. 4 and 16 as lying against the walls 165, it will be understood that the two picking units are shown in the drawings in the adjusted positions in which they are closest together, and accordingly the two units are readily adjustable with respect to each other. The basket 253 is preferably of a width equal to the minimum distance between the walls 165 of the two picking units.

The members 16 and 17 (Figs. 2 and 3) form means intermediate the height of the apparatus for connecting the two units for movement toward and away from each other. It is also preferred that some similar slidable connection be provided across the top of the apparatus to afford stability in the adjusting operation. For this purpose each casing 165 is provided with channeled structural elements 255 spaced from each other as shown in Fig. 2. The corresponding members 255 of the two units are connected by a slidable structural element 256, similar to the member 16 which slides relative to the elements 17.

As previously stated, the motor 23 drives all of the operating parts of the mechanism and also propels the vehicle over the ground. All of the supporting wheels of the vehicle are positively driven and the drive means directly associated with the various pairs of wheels are identical and only one such means need be described in detail. Each pair of wheels 11 and 12 is fixed to a shaft 260 (Fig. 1) and this shaft carries a bevel gear 261 meshing with a similar gear 262. The rotation of each gear 262, therefore, rotates one pair of the wheels 11 or 12. The front wheels 11 are carried by forks 263 fixed to the lower ends of the tubular members 264. These tubular members are slidable in bearings 265 for a purpose to be described. The rear wheels 12 are similarly rotatably supported by forks 266 fixed to the lower ends of sleeves 267. Such sleeves are mounted in the ends of bracket members 268 but are fixed against sliding movement with respect thereto. In order to secure the bracket members 268 to the sleeves 267, the bracket members may have their perpendicular portions split and clamped about the sleeves 267 by bolts 269.

The motor 23 may be provided with a clutch and transmission housing 272, as shown in Fig. 5. This housing contains a conventional clutch (not shown) operative by a pedal 273, and any desired type of transmission (not shown) within the housing 272 is operable by a gear shift lever 274. The elements referred to control the transmission of power from the engine 23 to a drive shaft 275, and this shaft may be provided with a suitable brake 276. At the rear end of the apparatus is arranged a differential 277 which delivers power in the usual way to oppositely extending shafts 278. Each of these shafts, in turn, is connected to a shaft 279 by means of a clip joint 280 which permits the shafts 279 to be moved endwise relative to the shaft 278 to provide for adjustments of the picking units toward and away from each other. The shaft 275 is supported in bearings 281 carried by the engine supports 22, while the shafts 279 are supported by bearings 282 carried by the rear ends of the lower casings of the two picking units.

The bevel gear 262 of each pair of rear wheels 12 is carried by the lower end of a shaft 285 (Figs. 2 and 5) and the upper end of each shaft 285 carries a bevel gear 286 meshing with a similar gear 287 carried by the adjacent end of the corresponding shaft 279. Thus the pairs of rear wheels 12 are driven from the engine and each set is permitted to rotate at different speeds by the normal operation of the differential 277.

The forward end of the shaft 275 also carries a differential 290 (Figs. 1 and 5) and this differential has opposite output shafts 291 each of which is connected by a universal joint 292 to a sleeve 293 having splined connection with a shaft 294 to accommodate the shaft referred to, to adjustments of the picking units toward and away from each other. Each shaft 294 is connected by a universal joint 295 to a shaft 296 carrying a bevel gear 297 meshing with a similar gear 298 on the upper end of a shaft 299 which carries the bevel gear 262. The gears 297 and 298 are arranged in a housing 300 which has been omitted in Fig. 5 to show the gears referred to in solid lines. The housing 300 is provided with an integral bracket portion 301 to brace the shaft 296 with respect to the corresponding tubular member 264.

As previously stated, the tubular members 264 are vertically slidable in their bearings 265. A pivot connection 305 is provided between each sleeve 264 and a fork 306 carried by a shaft 307. Integral alined sleeve members 308 (Fig. 1) receive the respective shafts 307 and have splined connection therewith to permit adjustment of the picking units as stated. The adjacent ends of the sleeves 308 are integral with a flattened bearing portion 309 through which extends a king pin 310 to rigidly connect the sleeves 308 to the body of the vehicle. The elements 307 and 308 constitute a lever which provides downward movement of one pair of wheels 11 while the other pair partakes of upward movement, thus permitting the wheels of the vehicle to accommodate themselves to uneven surfaces over which the apparatus passes.

The vehicle is adapted to be steered by turning a conventional steering wheel 315 mounted forwardly of a forward driver's seat 316 (Fig. 1) and connected to a conventional steering column 317. The latter, in turn, operates through a conventional worm and gear or other conventional steering connection 318 which operates to rock a shaft 319 to swing an arm 320. This arm is provided at its lower end with a fork 321 (Figs. 1 and 2) slotted to receive trunnions 322 carried by a tie rod 323. This rod has opposite ends slidable in sleeves 324 and each of these sleeves carries a preferably integral alined extension 325 having a conventional ball and socket connection 326 with an arm 327 carried by the associated sleeve 264.

One of the sleeves 324 and the elements associated therewith are shown in Fig. 19. The tie rod 323 has the top of the portion thereof arranged in the sleeve notched as at 330 to receive a sliding pin 331 by means of which the rod 323 and sleeve 324 may be locked together. The locking pin 331 is connected by a link 332 with one end of a lever 333 pivoted intermediate its ends to a boss 334 carried by the sleeve 324. The opposite end of the lever 333 has a downturned finger 335 engageable between lugs 336 carried by and projecting outwardly from the casing wall 27. A suitable Bowden wire 337 (Figs. 1 and 19) connects one end of each lever 333 with an operating handle 338 by means of which the operator can swing the levers 333. When this lever is in the position shown in Fig. 19 the elements 323, 324 and 325 are locked together to move as a unit when the steering wheel 315 is turned, to thus turn the front wheels 11 to steer the vehicle. When the lever 333 is swung in a clockwise direction from the position shown in Fig. 19, the pin 331 will be released from the notches 330 and the finger 335 will engage between the lugs 336 to lock the corresponding sleeve 324 against movement. This operation is performed to disconnect the steering wheel 315 from the wheels 11 during adjustment of the picking units 13 and 14 toward or away from each other. When these units have been suitably adjusted the levers 333 are returned to the normal position shown in Fig. 19 to permit the steering of the wheels.

The chains 58, 59, 103 and 113 derive their driving power from the rear shafts 279 (Fig. 5) by means of a drive shaft 342 associated with each picking unit. The drive means for the elements of each unit being identical, only one need be described in detail. Referring to Fig. 5, it will be noted that the shaft 342 of each unit is supported in bearings 343 and 344 and is provided at its rear end with a bevel gear 345 meshing with a similar gear 346 carried by the associated shaft 279. At its forward end the shaft 342 carries a bevel gear 348 meshing with a bevel gear 349 carried by the shaft 87 previously described. The shaft 87 thus will be rotated to drive the chains 58 and 59 by the means previously described and shown in Figs. 7, 8 and 9. It will be obvious that each shaft 87 carries the drive means in Figs. 7, 8 and 9 at each end to drive all of the chains 58 and 59 of the corresponding picking unit.

Another shaft 352 is arranged parallel to the shaft 87 and carries a spur gear 353 meshing with a similar gear 354 carried by the shaft 87. As previously stated, the chains 103 and 113 (Figs. 5 and 6) are respectively driven by the shafts 100 and 110. Referring to Figs. 3 and 5, it will be noted that the shafts 100 and 110 respectively carry bevel gears 355 and 356 and these gears mesh respectively with similar gears 357 and 358 carried by the shaft 352. Accordingly it will be apparent that the chain mechanisms of the picker mechanisms will be driven by the shaft 352 of each unit from the rear drive shafts 279.

The shaft 87 of each unit is also utilized to drive the corresponding shaft 158 of the cotton gathering mechanism. Referring to Fig. 3, it will be noted that each shaft 87 projects through the duct 146 and wall 173 of each unit and carries a sprocket 360 around which passes a chain 361. The shaft 158 projects through the same wall and carries a sprocket 362 around which the chain 361 passes. Accordingly the shaft 158 is driven from the shaft 87, and, in turn, drives the shaft 186 and associated elements (Fig. 2) through the chain 211.

Each of the fans 166 is driven from its associated rear shaft 279. Referring to Fig. 5 the numeral 365 designates a gear carried by each rear shaft 279 and meshing with a bevel gear 366 (Fig. 2) carried by the lower end of a vertical shaft 367 mounted in bearings 368. The upper end of each shaft 367 carries a gear 369 preferably housed as at 370 and engaging a bevel gear 371 carried by one end of a shaft 372. This shaft is journalled in bearings 373 carried by the top wall 171 and extends angularly forwardly as shown in Fig. 5. The forward end of each shaft 372 carries a bevel gear 374 preferably housed as at 375 and meshing with a similar gear 376 mounted on the upper end of the corresponding fan shaft.

Means are provided for positively moving the units 13 and 14 toward and away from each other. The forward wall 31 (Fig. 1) and the rear wall 33 (Fig. 5) are each provided with a bearing 380 in which is mounted a shaft 381 fixed against longitudinal movement by collars 382 mounted thereon and engaging each side of the bearing 380. The opposite ends of the shafts 381 are threaded as at 383, the threads on the end of each shaft being reversed with respect to each other. These threaded ends operate through internally threaded sleeves 384 carried by the front walls 27 and rear walls 29.

The front shaft 381 is provided with a bevel gear 385 (Figs. 1 and 5) meshing with a similar gear 386 carried by a shaft 387 extending from front to back of the apparatus and provided at its rear end with a bevel gear 388 meshing with a similar gear 389 and the rear shaft 381. It will be apparent that the two shafts 381 are thus simultaneously rotatable and that the operation of the threads 383 in the sleeves 384 will move the picking units 13 and 14 toward and away from each other. Rotational movement of the shafts 381 is provided by means of a wheel 390 carried by the upper end of a shaft 391 (Fig. 1), and the lower end of the shaft 391 carries a bevel gear 392 meshing with a similar gear 393 carried by the front shaft 381.

The operation of the apparatus is as follows:

As previously stated the apparatus is adapted to simultaneously pick cotton from two rows and to bridge over an intervening row during such operation. The purpose of this is to provide a vehicle which will simultaneously pick two rows and still be wider than would be possible if two adjacent rows were picked. In this way the vehicle has much greater stability in operation. As is well known, there is some variation in the distances between rows of farm crops, particularly when they are hand planted. This variation is not great but it is necessary to compensate for it in order to render the present apparatus practicable.

The first step in the operation of the apparatus, therefore, is to adjust the units 13 and 14 toward or away from each other, if necessary, to accommodate the two picking mechanisms to the two rows of cotton to be initially picked. Before entering the rows, the operator may measure the distance between the first and third rows, for example, and assuming that adjustment is necessary, the operator will first pull the Bowden wire handle 338 (Fig. 1) to rock the lever 333 (Fig. 19). This operation releases the locking finger 331 from the notch 330 engaged thereby, and will move the finger 335 between the two lugs 336. In this connection it will be noted that the locking finger 335 will be in proper position for such operation when the dirigible front wheels 11 at opposite sides of the vehicle are parallel to each other. The operator will make certain of this parallelism before operating the lever 333 and the latter operation will release the wheels 11 from mechanical connection with the rod 323 and will lock each rod 325 to the front wall of the associated picking unit, thus holding the wheels 11 in parallelism.

In the embodiment of the invention shown two operators are required, one to operate the control elements 315, 338 and 390 (Fig. 1) and the other to operate the control elements 273, 274 and 276 (Fig. 5). When the front wheels have been locked as stated, the rear operator will start the vehicle by conventional operation of the clutch pedal 273 (Fig. 5) and gear shift lever 274. With the vehicle moving slowly over the ground, the front operator will rotate the wheel 390 in one direction, depending upon whether the picking units are to be moved closer together or further apart. Rotation of the wheel 390 rotates the front shaft 381 (Figs. 1 and 5) through gears 392 and 393, while the back shaft 381 will be simultaneously rotated by the shaft 387 and its gear connections with the shafts 381. Rotation of the shafts 381 feeds the screws 383 thereof through the threaded sleeves 384 to move the units 13 and 14 slowly toward or away from each other.

During the adjustment of the units toward and away from each other it is essential that the front wheels 11 be held in parallelism so that they will be in the proper relationship when again mechanically connected to the steering wheel. It is for this reason that the front wheels are locked during the adjusting operation and the vehicle travels over the ground as the two units 13 and 14 are adjusted toward and away from each other, all of the supporting wheels of the vehicle gradually side-slipping over the ground. The rows of cotton to be picked will never vary more than one foot in their distances apart, and accordingly the maximum distance of adjustment for each unit would be six inches. This adjustment can readily gradually take place during forward movement of the vehicle over a reasonable distance of travel. After the adjustment as to width of the rows is accomplished, the operator will push downwardly on the handle 338 to restore the normal position of each lever 333 (Fig. 19) to again unlock the wheels 11 and mechanically connect them to the steering wheel 315. The apparatus is now ready for the picking operation.

The vehicle may be readily driven and steered to place it in proper alinement with the first two rows of cotton to be picked. The vehicle will be driven forwardly with the two rows of cotton entering the opening 30 in the respective walls 27.

The sprocket 51 of each picking unit is driven through the gearing shown in Figs. 7, 8 and 9, and the shaft 87 carrying the gears 92 and 94 of each unit will be driven from the shaft 342 and its bevel gears 348 and 349. The shaft 342, in turn, is driven by the shaft 279 through gears 345 and 346. The driving of the sprockets 51 effects bodily movement of the tubes 68 which carry the picker spindles 77. In the operative runs of the chains 58 associated with the sprockets 46 and 51, that is, at the upper side of the view shown in Fig. 6, the picker spindles 77 will be arranged perpendicular to the length of the row of plants from which cotton is to be picked by such picking unit. The cam mechanism in Fig. 12 functions in the manner previously described to move the spindles 77 into the row of plants adjacent the front end of the apparatus in the same perpendicular relationship, and accordingly the spindles do not swing about the axis 43 to strike against the plants. At the ends of the operative runs of the chains 58, the picker spindles 77 similarly move out of the row of plants by virtue of the operation of the cam 118, for the same reason.

As prevously stated, the net rearward speed of the tubes 68 and spindles 77 rearwardly relative to the vehicle is the same as the forward speed of the vehicle relative to the ground. Therefore, the spindles 77 enter the row between the plants and each vertical row of spindles will remain between the same adjacent pair of plants throughout the rearward travel of the spindles. To insure against a vertical row of spindles entering midway between the plants of an adjacent pair and remaining in such position throughout their rearward relative travel, under which conditions the cotton bolls would not be properly contacted, the gearing shown at the top of Fig. 7 and in Figs. 8 and 9 is employed. This gearing alternately speeds up and slows down the relative rearward travel of the operative spindles 77 to cause them to move back and forth between the plants of the adjacent pair between which they operate. The gear 93 is constantly driven at a uniform speed by the gear 92 and when this drive means is operative for rotating the associated sprocket 51, the rearward movement of the operative spindles 77 relative to the vehicle will be slightly slower than the speed of movement of the vehicle over the ground. Such operation takes place when the blank spots 96 of the gear 94 are opposite the gear 82. Between these points, the gear segments will engage the gear 82 and momentarily drive this gear, and hence the shaft 56 and sprocket 51, at a somewhat greater speed and at such times the speed of movement of the spindles 77 relative to the vehicle will be slightly greater than the speed of movement of the vehicle over the ground. The overrunning clutch shown in Fig. 9 permits this operation to take place, as described. The alternate acceleration and deceleration in the movement of the operating spindles 77 causes each vertical row of the latter to move back and forth between the plants of the adjacent pair between which they are arranged, thus insuring greater contact of the spindles 77 with the cotton bolls.

During the operative runs of the spindles 77 these elements are rotated on their own axes to engage and wind thereon the cotton with which it comes in contact. The chain 103 (Fig. 6) of each picking unit has one run thereof engaging the sprockets 74 associated with the tubes extending along the operative runs of the chain 58. The chain 103 is operated by the sprocket 102 and this sprocket is driven by the associated gear 355. This gear, in turn, is driven by the gear 357 carried by the shaft 352, and the gear 353 on such shaft is driven by the gear 354 on the associated shaft 86. Thus, as the spindles 77 move rearwardly in their operative runs, the worms 78 thereon will be driven by the screw shaft 73 (Figs. 7 and 10). Thus it will be apparent that in their operative runs the spindles 77 move rearwardly relative to the vehicle and "play" back and forth between the adjacent plants to insure contact of the spindles with all of the cotton in the bolls of the plants, while the spindles 77 are being rotated in one direction to wind the cotton thereon.

As the chain 58 of each unit passes around the sprocket 51 (Fig. 6) the cam 118 (Fig. 12) will cause the spindles 77 to remain perpendicular to the length of the row of plants in which it has just been operating until the spindles are clear of the plants. Thereafter, the spindles will assume the angular positions shown in Fig. 6 during their return runs to minimize the distance from the centers of the shafts 43 and 50 to the outside wall 26 of the corresponding unit. By this arrangement the overall width of the apparatus is maintained less than the distance between the two rows of plants outwardly of the apparatus.

During the return runs of the chains 58 the spindles 77 are rotated in the direction opposite their direction of rotation during the picking operation described. This reverse rotation of the spindles is accomplished by engagement of the sprockets 74 (Fig. 6) by the chain 113. This chain is driven by the sprocket 112 which is rotated in the opposite direction from the sprocket 100. However, the side of the chain 113 which engages the sprocket is opposite relatively to the side 103 which engages the sprockets, and these sprockets have opposite sides engaged by the chains 103 and 113. Therefore the rotation of the sprockets 74 by the chain 113 is opposite the direction of rotation of the sprockets imparted by the chain 103. Thus during at least a portion of the return run of the spindles 77 of each picking mechanism, these spindles will be reversely rotated with respect to their rotation while picking cotton. This reverse rotation tends to loosen the cotton which has been wound on the spindles, thus greatly facilitating the removal of the cotton.

During the operative runs of the spindles 77 the vacuum manifold 150 (Fig. 3) will create a flow of air transversely of the cotton plants toward the manifold 150, this manifold having openings similar to those shown in Fig. 13. The various branches of the cotton plant extend in all directions radially around the plant and the function of the manifold 150 is to tend to swing the branches of the cotton plants sufficiently to insure the engagement of the spindles 77 with all of the cotton bolls during the picking operation.

During the return runs of the spindles 77 the similar vacuum manifold 135 removes the cotton from the spindles. As stated, the reverse rotation of the spindles 77 in their return runs tend to unwind and thus loosen the cotton from the spindles and this makes it quite easy for the manifold openings 141, 143 and 144 (Fig. 13) of each manifold 135 to remove the cotton from the spindles. The manifold 135 is subject to a partial vacuum at all times, and accordingly there is a constant flow of air into the openings 141, 143 and 144 and these openings are arranged in close proximity to the free ends of the spindles in their return runs as shown in Figs. 3 and 7. Thus the cotton loosened and partially unwound by the reverse rotation of the spindles will "flow" from the ends of the spindles into the openings 141, 143 and 144.

The openings 141, 143 and 144 of each set (Fig. 13) are arranged in vertical alinement to simultaneously effect a flow of air along all of the spindles 77 of each vertical row. These openings are separately connected to their own ducts 137, 138 and 139, however, to insure a uniform intake of air through the height of each set of openings. All of the ducts 137, 138 and 139 of each picking mechanism communicate at their upper ends with one of the ducts 146 and this duct has its extension 176 arranged between the runs of the chains 154 at the upper portion of the corresponding picking unit. The upper end of each duct 176 terminates a short distance below the corresponding fan 166 which is of substantial capacity and in constantly discharging air from the top of the unit a substantial partial vacuum is maintained below the fan and consequently in the take off ducts 146 and 176 and 151 and 180.

The upper end of each duct 146 is arranged beneath the lower runs of the corresponding chains 154 and terminates just below the corresponding gathering frames 169 (Figs. 3 and 14) defining the collecting screen, as aforesaid. Cotton moving into the openings 141, 143 and 144 will flow upwardly through the manifolds 136 and ducts 146 and will collect against the bottoms of the bars 163 of the frames 169 as these bars move progressively across the ducts 146. The bars 163 being smooth, deep and relatively close together, they permit a free flow of air upwardly therebetween without permitting the cotton to go all the way through the frames 160 or to adhere to any portion thereof.

All portions of the bottom runs of the frames 160 will be subjected to the action of upwardly flowing air to hold the gathered cotton against the frames 160, until the partition and the casing extension 223' thereabove serve to very narrowly limit communication between the spaces on opposite sides of the partition 222', and this fact, together with the fact that air flows freely into the space to the right of the partition 222' through the openings 224 substantially raises the pressure in this space approximately to that of the atmosphere.

The manifold 215 (Fig. 2) is constantly maintained substantially below atmospheric pressure by connection of the ducts 218 to the fan chamber through the bottoms of the overhanging portions 174 thereof as shown in Fig. 3. The manifold 215 has openings in the bottom thereof in close proximity to the chains 192 (Figs. 2 and 16) and beneath the lower runs of the chains 192 is arranged the opening 222 of the duct 221. Most of the air entering the manifold 215 thus will flow from the duct 221 and this duct has its opposite end arranged beneath the collecting frames 160 defining the collecting screen as the latter move to the right beneath the partition 222'. Thus the gathered cotton held by the frames 160 will be released from the upward flow of air through the frames as the partition 222' is passed, and the downward flow of air then encountered will cause the cotton to enter the opening 223, flow rearwardly through the duct 221, and thence upwardly into engagement with the collecting frames 194. The latter result takes place because of the upward flow of air from the opening 222 into the manifold 215.

As the frames 194 (Figs. 2 and 17) which define the second screen move beneath the bottom of the manifold 215 they will collect against the bottoms of the bars 197 and 198 the cotton moving upwardly from the opening 222. During such movement the blades 197 and 198 the roller 207 will move from the end 225 of the cam 228 and the springs 201 of the corresponding collecting unit 194 will move the edges 203 toward the edges 202 to clamp therebetween the cotton which moves beneath these edges while they were previously held separated. The number and proximity of the sets of the plates 197 and 198 and the number and proximity of the edges 202 and 203 are such as to provide a sufficient gripping of the cotton to positively hold all of it against the bottoms of the units 194. These units thus form engaging and holding means for the cotton and the cotton will be held against the bottoms of the units 194 after passing beyond the influence of the air flowing upwardly to the manifold 215.

As the engaging and holding units move beneath the manifold 230 the cotton held by such units will be subjected to a down draft of air, the manifold 230 being connected by the duct 233 with the upper or pressure side of the fan housing. The manifold 230 has openings in its lower side and the casing opening 185 (Fig. 2) is arranged directly below the manifold 230. The air flowing from the manifold 230 blows through the cotton held by the units 194 to remove substantially all of the dirt, sticks and other foreign material in the cotton.

From beneath the manifold 231 the engaging and holding devices 194 progressively pass around the sprockets 191 until they reach the upper runs of the chains 192. Thereafter, it is no longer necessary or desirable to grip the cotton by the edges 202 and 203 of the units 194, and shortly after reaching the upper runs of the chains the rollers 207 engage the starting end 247 of the cam 208, and the roller and associated parts will be pulled against the tension of the springs 201 to release the gripping edges or teeth 202 and 203 from the cotton. From such point the units 194 pass over the top of the air manifold 240 (Figs. 2 and 16). This manifold is connected by the duct 241 to the air duct 233 and accordingly air is pumped into the manifold 240 at all times. Air from the manifold 240 flows upwardly through the top openings 242 and the louvers 243 of the manifold 240 of each picking unit directs the air forwardly and inwardly toward the center of the apparatus.

Accordingly air will be blown upwardly at an angle through the units 194 as these units pass over the top of the manifold 240, and the cotton having been released by operation of the cam 208, it will be blown upwardly and inwardly at an angle directly through the opening 246, or against the top wall 181 to be guided thereby through the opening 246. The cotton discharged through the openings 246 of the picking units will flow downwardly into the basket 253, the woven wire or similar bottom of such basket freely permitting the discharge of air through the basket 253. Thus the cotton will be collected in the basket 253 and this basket may be removed and replaced by an empty basket whenever it becomes filled. The top plate 250 is relatively slidable in the guide 252 and it may be suitable movably connected to the casing 180 of the other picking unit to permit it to manually slide to an open position for removal of the basket 253.

From the foregoing, it will be apparent that the present apparatus provides a novel mechanism for picking cotton from plants in the field, removing cotton from the picking means and conveying it to gathering means, conveying it to collecting means and mechanically holding it while dirt and foreign material is removed from the cotton, and then releasing the cotton and conveying it directly into a collecting basket in a relatively loose free condition. The apparatus is automatic for performing all of the functions stated and is simultaneously operative for picking two rows of cotton. All of the parts of the apparatus are driven from the same source and the vehicle itself is propelled over the ground by the same source. Moreover, the apparatus is capable of adjustment within reasonable limits to accommodate itself to differences in the distances between rows of cotton.

The apparatus is readily steered by turning the wheel 315 (Fig. 1) and the mounting of the front wheels of the vehicle permits the wheels to accommodate themselves to variations in the contour of the ground. The lever 308 and associated elements constitutes means for dividing the effect of unevenness of the ground between the two sets of front wheels 11. When one set of front wheels moves upwardly the lever 302 imparts relative downward movement to the other set of front wheels, thus more easily accommodating the vehicle to unevenness in the ground. The slip joints between the elements 307 and 308 permit relative lengthening and shortening of the lever arms as the wheels 11 move upwardly and downwardly. The slip joints between the driving shaft elements 293 and 294 and the universal joints in these shaft elements also permit for the relative vertical movement of the two sets of front wheels. Inasmuch as the actual total movement is relatively slight it is unnecessary to similarly provide the steering connections with slidable means, the steering operations and the relatively slow moving vehicle being not required to take place with a high degree of accuracy. The ball and socket joints 326 are preferably of the spring pressed socket type to prevent the placing of undue pulling and pushing strains on the steering connections 323 and 325 incident to the relatively slight lengthening and shortening of the distances between centers of the balls of the two joints 326.

While the invention has been described in detail with a specific example, such example is intended as an illustration only inasmuch as it will be apparent that other modifications in the construction, arrangement and general combination of parts may be resorted to without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letters Patent is:

1. In an apparatus of the class described, a device for collecting picked cotton, means operatively associated with said device for mechanically engaging and holding the cotton collected by said device comprising cooperating relatively movable elements and means operatively associated with said elements for relatively moving said elements to engage and hold the cotton, and pneumatic means operatively associated with said engaging and holding means for providing a jet of air through the cotton held by said engaging and holding means for removing loose foreign material from the cotton.

2. In an apparatus of the class described, a device for collecting picked cotton, means operatively associated with said device for mechanically engaging and holding the cotton collected by said device comprising cooperating relatively movable elements and means operatively associated with said elements for relatively moving said elements to engage and hold the cotton, pneumatic means operatively associated with said engaging and holding means for providing a jet of air through the cotton held by said engaging and holding means for removing loose foreign material from the cotton, and means operatively associated with said engaging and holding means for releasing said engaging and holding means from the cotton held thereby after such cotton has been subjected to said jet of air.

3. In an apparatus of the class described, a device for collecting picked cotton, means operatively associated with said device for mechanically engaging and holding the cotton collected by said device comprising cooperating relatively movable elements and means operatively associated with said elements for relatively moving said elements to engage and hold the cotton, pneumatic means operatively associated with said engaging and holding means for providing a jet of air through the cotton held by said engaging and holding means for removing loose foreign material from the cotton, means operatively associated with said engaging and holding means for releasing said engaging and holding means from the cotton held thereby after such cotton has been subjected to said jet of air, a receptacle for the cleaned cotton, and vacuum conveying means operatively associated with said engaging and holding means for conveying the cleaned cotton to said receptacle.

4. In an apparatus of the class described, a device for collecting picked cotton, means operatively associated with said device comprising cooperating relatively movable teeth and means operatively associated with said teeth for relatively moving said teeth to engage and hold the cotton, pneumatic means operatively associated with said teeth for providing a jet of air through the cotton held by said teeth for removing loose foreign material from the cotton, and means operatively associated with said teeth for relatively moving said teeth to release said teeth from the cotton after such cotton has been subjected to said jet of air.

5. In an apparatus of the class described, a device for collecting picked cotton, means operatively associated with said device comprising cooperating relatively movable teeth and means operatively associated with said teeth for relatively moving said teeth to engage and hold the cotton, pneumatic means operatively associated with said teeth for providing a jet of air through the cotton held by said teeth for removing loose foreign material from the cotton, means operatively associated with said teeth for relatively moving said teeth to release said teeth from the cotton after such cotton has been subjected to said jet of air, a receptacle for the cleaned cotton, and vacuum conveying means operatively associated with said teeth for conveying the cleaned cotton to said receptacle.

6. In an apparatus of the class described, a movable screen for collecting picked cotton, means operatively associated with said screen for moving said screen, means on said screen for mechanically engaging and holding cotton collected on said screen comprising relatively movable elements and means operatively associated with said elements for relatively moving said elements to engage and hold the cotton on said movable screen, and pneumatic means operatively associated with said movable screen for providing a jet of air through the cotton held on said screen by said engaging and holding means.

7. In an apparatus of the class described, a movable screen for collecting picked cotton, means operatively associated with said screen for moving said screen, means on said screen for mechanically engaging and holding cotton collected on said screen comprising relatively movable elements and means operatively associated with said elements for relatively moving said elements to engage and hold the cotton on said movable screen, pneumatic means operatively associated with said movable screen for providing a jet of air through the cotton held on said screen by said engaging and holding means, and means operatively associated with said engaging and holding means for releasing said engaging and holding means from the cotton held thereby after such cotton has been subjected to said jet of air.

8. In an apparatus of the character described, an endless screen for collecting picked cotton, means operatively associated with said endless screen for moving said endless screen, means operatively associated with said endless screen comprising cooperating relatively movable teeth and means operatively associated with said teeth for relatively moving said teeth to engage and hold the cotton collected on said endless screen, pneumatic means operatively associated with said endless screen for providing a jet of air through the cotton held on said endless screen by said teeth, and means operatively associated with said teeth for relatively moving said teeth to release said teeth from the cotton held thereby after such cotton has been subjected to said jet of air.

9. In an apparatus of the character described, an endless screen for collecting picked cotton, means operatively associated with said endless screen for moving said endless screen, means operatively associated with said endless screen comprising cooperating relatively movable teeth and means operatively associated with said teeth for relatively moving said teeth to engage and hold the cotton collected on said endless screen, pneumatic means operatively associated with said endless screen for providing a jet of air through the cotton held on said endless screen by said teeth, said endless screen having an upper run to which the cotton moves after the cotton has been subjected to said jet of air, and means operatively associated with said teeth and operative in the upper run of said endless screen for relatively moving said teeth to release said teeth from the cotton held thereby after such cotton has been subjected to said jet of air.

10. In an apparatus of the character described, an endless screen for collecting picked cotton, means operatively associated with said endless screen for moving said endless screen, means operatively associated with said endless screen comprising cooperating relatively movable teeth and means operatively associated with said teeth for relatively moving said teeth to engage and hold the cotton collected on said endless screen, pneumatic means operatively associated with said endless screen for providing a jet of air through the cotton held on said endless screen by said teeth, said endless screen having an upper run to which the cotton moves after the cotton has been subjected to said jet of air, means operatively associated with said teeth and operative in the upper run of said endless screen for relatively moving said teeth to release said teeth from the cotton held thereby after such cotton has been subjected to said jet of air, a receptacle for the cleaned cotton, and vacuum conveying means operatively associated with said endless screen in the area of the upper run thereof for conveying the cleaned cotton to said receptacle.

11. In an apparatus of the character described, a cotton picking unit comprising a group of vertically spaced picker spindles, a vertical manifold positioned adjacent said vertically spaced picker spindles, a collecting screen in the path of said manifold, vacuum means operatively associated with said manifold and collecting screen for conveying picked cotton from said spindles through said manifold to said collecting screen.

12. In an apparatus of the character described, a cotton picking unit comprising a group of vertically spaced picker spindles, a vertical manifold positioned adjacent said vertically spaced picker spindles, a movable collecting screen in the path of said manifold, means operatively associated with said movable collecting screen for moving the same, vacuum means operatively associated with said manifold and collecting screen for conveying picked cotton from said spindles through said manifold to said collecting screen, a baffle positioned in the path of movement of said collecting screen for cutting off the vacuum from said collecting screen, thereby permitting separation of the cotton from said collecting screen.

13. In an apparatus of the character described, a cotton picking unit comprising a group of vertically spaced picker spindles, a vertical manifold positioned adjacent said vertically spaced picker spindles, an endless collecting screen in the path of said manifold, means operatively associated with said endless collecting screen for moving the same, vacuum means operatively associated with said manifold and endless collecting screen for conveying picked cotton from said spindles through said manifold to said collecting screen, a baffle positioned in the path of movement of said endless collecting screen for cutting off the vacuum from said endless collecting screen, thereby permitting separation of the cotton from said endless collecting screen.

14. In an apparatus of the character described, a cotton picking unit comprising a group of vertically spaced picker spindles, a vertical manifold positioned adjacent said vertically spaced picker spindles, an endless collecting screen in the path of said manifold, means operatively associated with said endless collecting screen for moving the same, vacuum means operatively associated with said manifold and endless collecting screen for conveying picked cotton from said spindles through said manifold to said endless collecting screen, a baffle positioned in the path of movement of said endless collecting screen for cutting off the vacuum from said endless collecting screen, thereby permitting separation of the cotton from said endless collecting screen, a second screen adjacent said endless collecting screen, vacuum means operatively associated with said second screen for conducting to said second screen cotton which has separated from said endless collecting screen, and pneumatic means operatively associated with said second screen for providing a jet of air through the cotton on said second screen.

15. In an apparatus of the character described, a cotton picking unit comprising a group of vertically spaced picker spindles, a vertical manifold positioned adjacent said vertically spaced picker spindles, an endless collecting screen in the path of said manifold, means operatively associated with said endless collecting screen for moving the same, vacuum means operatively associated with said manifold and endless collecting screen for conveying picked cotton from said spindles through said manifold to said endless collecting screen, a baffle in the path of movement of said endless collecting screen for cutting off the vacuum from said endless collecting screen, thereby permitting separation of the cotton from said endless collecting screen, a second screen adjacent said endless collecting screen, vacuum means operatively associated with said second screen for conducting to said second screen cotton which has separated from said endless collecting screen, said second screen comprising means for mechanically engaging and holding the cotton conducted thereto, and means operatively associated with said second screen for providing a jet of air through the cotton held on said second screen by engaging and holding means.

16. In an apparatus of the character described, a cotton picking unit comprising a group of vertically spaced picker spindles, a vertical manifold positioned adjacent said vertically spaced picker spindles, an endless collecting screen in the path of said manifold, means operatively associated with said endless collecting screen for moving the same, vacuum means operatively associated with said manifold and endless collecting screen for conveying picked cotton from said spindles through said manifold to said endless collecting screen, a baffle in the path of movement of said endless collecting screen for cutting off the vacuum from said endless collecting screen, thereby permitting separation of the cotton from said endless collecting screen, a second endless screen adjacent said collecting screen, means operatively associated with said second endless screen for moving the same, vacuum means operatively associated with said second endless screen for conducting to said second endless screen cotton which has separated from said collecting screen, and pneumatic means operatively associated with second endless screen for providing a jet of air through the cotton on said second endless screen.

17. In an apparatus of the character described, a cotton picking unit comprising a group of vertically spaced picker spindles, a vertical manifold positioned adjacent said vertically spaced picker spindles, an endless collecting screen in the path of said manifold, means operatively associated with said endless collecting screen for moving the same, vacuum means operatively associated with said manifold and endless collecting screen for conveying picked cotton from said spindles through said manifold to said endless collecting screen, a baffle in the path of movement of said endless collecting screen for cutting off the vacuum from said endless collecting screen, thereby permitting separation of the cotton from said endless collecting screen, a second endless screen adjacent said collecting screen, means operatively associated with said second endless screen for moving the same, vacuum means operatively associated with said second endless screen for conducting to said second endless screen cotton which has separated from said collecting screen, means on said second endless screen for mechanically engaging and holding cotton conducted thereto, and pneumatic means operatively associated with second endless screen for providing a jet of air through the cotton held on said second endless screen by said mechanical engaging and holding means.

18. In an apparatus of the character described, a cotton picking unit comprising a group of vertically spaced picker spindles, a vertical manifold positioned adjacent said vertically spaced picker spindles, an endless collecting screen in the path of said manifold, means operatively associated with said endless collecting screen for moving the same, vacuum means operatively associated with said manifold and endless collecting screen for conveying picked cotton from said spindles through said manifold to said endless collecting screen, a baffle in the path of movement of said endless collecting screen for cutting off the vacuum from said endless collecting screen, thereby permitting separation of the cotton from said endless collecting screen, a second endless screen adjacent said collecting screen, means operatively associated with said second endless screen for moving the same, vacuum means operatively associated with said second endless screen for conducting to said second endless screen cotton which has separated from said collecting screen, said second endless screen having means for mechanically engaging and holding the cotton conducted thereto comprising cooperating relatively movable teeth, means operatively associated with said teeth for relatively moving said teeth to engage and hold the cotton on said second endless screen, and pneumatic means operatively associated with second endless screen for providing a jet of air through the cotton held on said second endless screen by said teeth.

19. Apparatus in accordance with claim 17, said apparatus including means operatively associated with said mechanical engaging and holding means for releasing said mechanical engaging and holding means from the cotton held thereby after such cotton has been subjected to said jet of air.

20. Apparatus in accordance with claim 18, said apparatus including means operatively associated with said teeth for relatively moving said teeth to release said teeth from the cotton held thereby after such cotton has been subjected to said jet of air.

21. Apparatus in accordance with claim 18 wherein said second endless screen has an upper run to which the cotton moves after the cotton has been subjected to said jet of air, and means operatively associated with said teeth and operative in said upper run of said second endless screen for relatively moving said teeth to release said teeth from the cotton held by said teeth.

22. Apparatus in accordance with claim 18 wherein said second endless screen has an upper run to which the cotton moves after the cotton has been subjected to said jet of air, and means operatively associated with said teeth and operative in said upper run of said second endless screen for relatively moving said teeth to release said teeth from the cotton held by said teeth, a receptacle, and vacuum conveying means operatively associated wth said second endless screen in the area of the upper run thereof for conveying the cleaned cotton to said receptacle.

PERRY W. SPELL.

REFERENCES CITED

The following references are of record in the file of this patent:

UNITED STATES PATENTS

| Number | Name | Date |
| --- | --- | --- |
| 1,026,432 | Dey | May 14, 1912 |
| 1,547,333 | Kinard | July 28, 1925 |
| 1,755,825 | Johnston et al. | Apr. 22, 1930 |
| 1,936,748 | Benjamin | Nov. 28, 1933 |
| 1,953,245 | Mackenzie | Apr. 3, 1934 |
| 2,299,022 | Kinard | Oct. 13, 1942 |
| 2,337,726 | Rainford et al. | Dec. 28, 1943 |
| 2,482,216 | Rust | Sept. 20, 1949 |